Dec. 16, 1941.                    W. HEINZE                    2,266,366
                         ELECTRIC CALCULATING MACHINE
              Original Filed March 20, 1933        7 Sheets-Sheet 1

Inventor
W. Heinze
By: Glascock Downing & Seebold
Attys.

Dec. 16, 1941.                    W. HEINZE                    2,266,366
                          ELECTRIC CALCULATING MACHINE
              Original Filed March 20, 1933        7 Sheets-Sheet 4
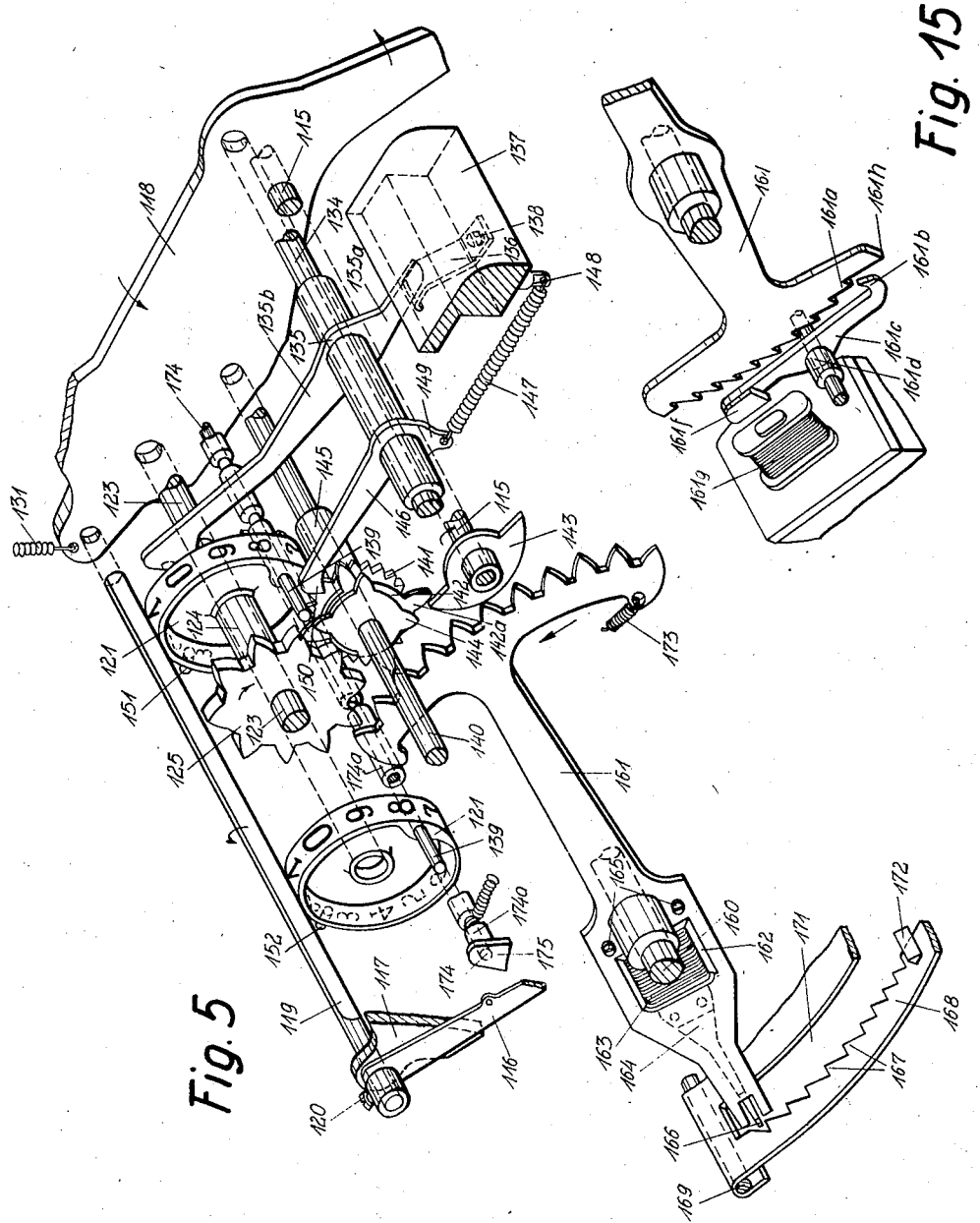
Inventor,
W. Heinze
By: Glascock Downing & Seebold
Atts.

Dec. 16, 1941.   W. HEINZE   2,266,366
ELECTRIC CALCULATING MACHINE
Original Filed March 20, 1933   7 Sheets-Sheet 5

Inventor,
W. Heinze
Glascock Downing & Seebold
Attys.

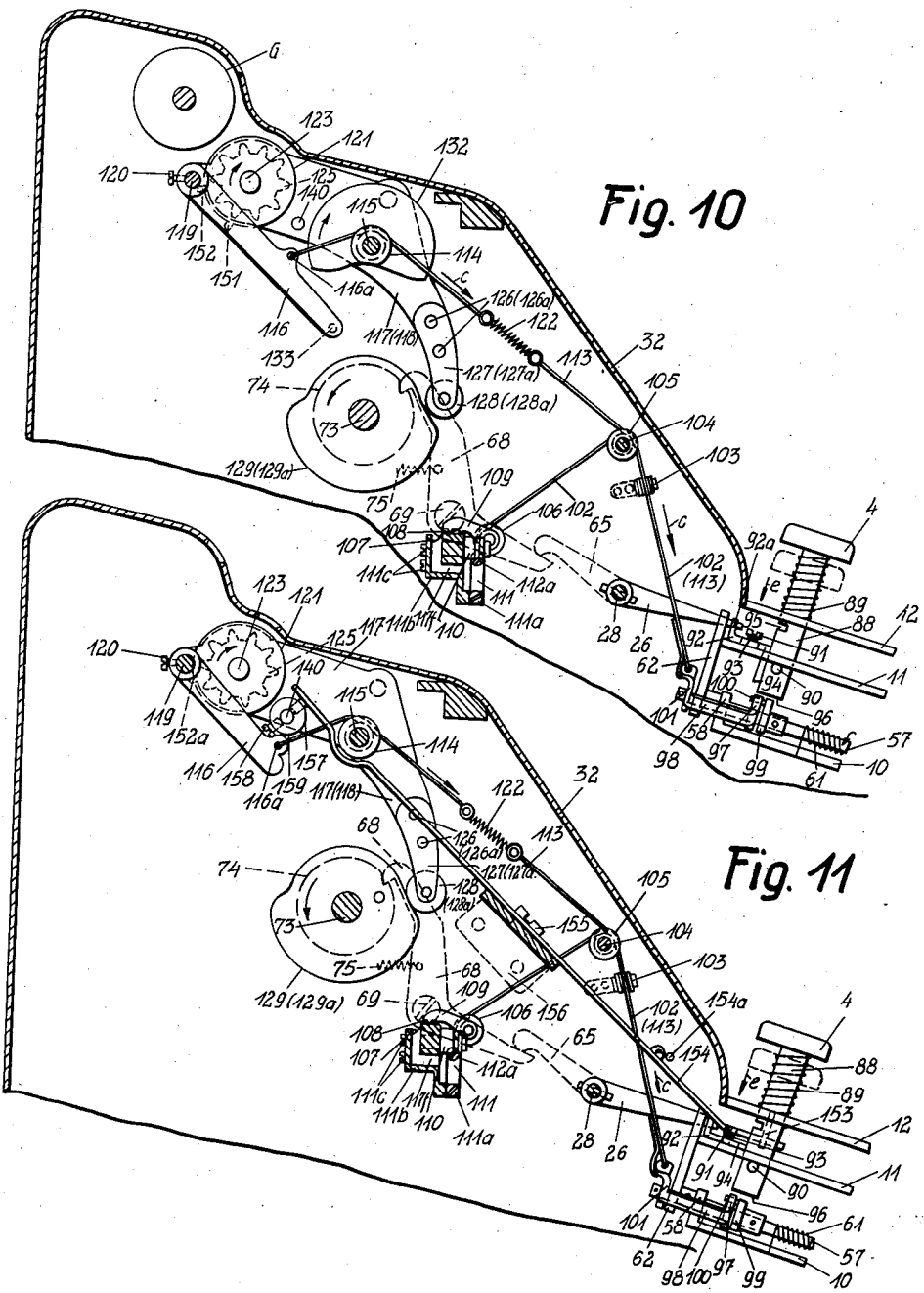

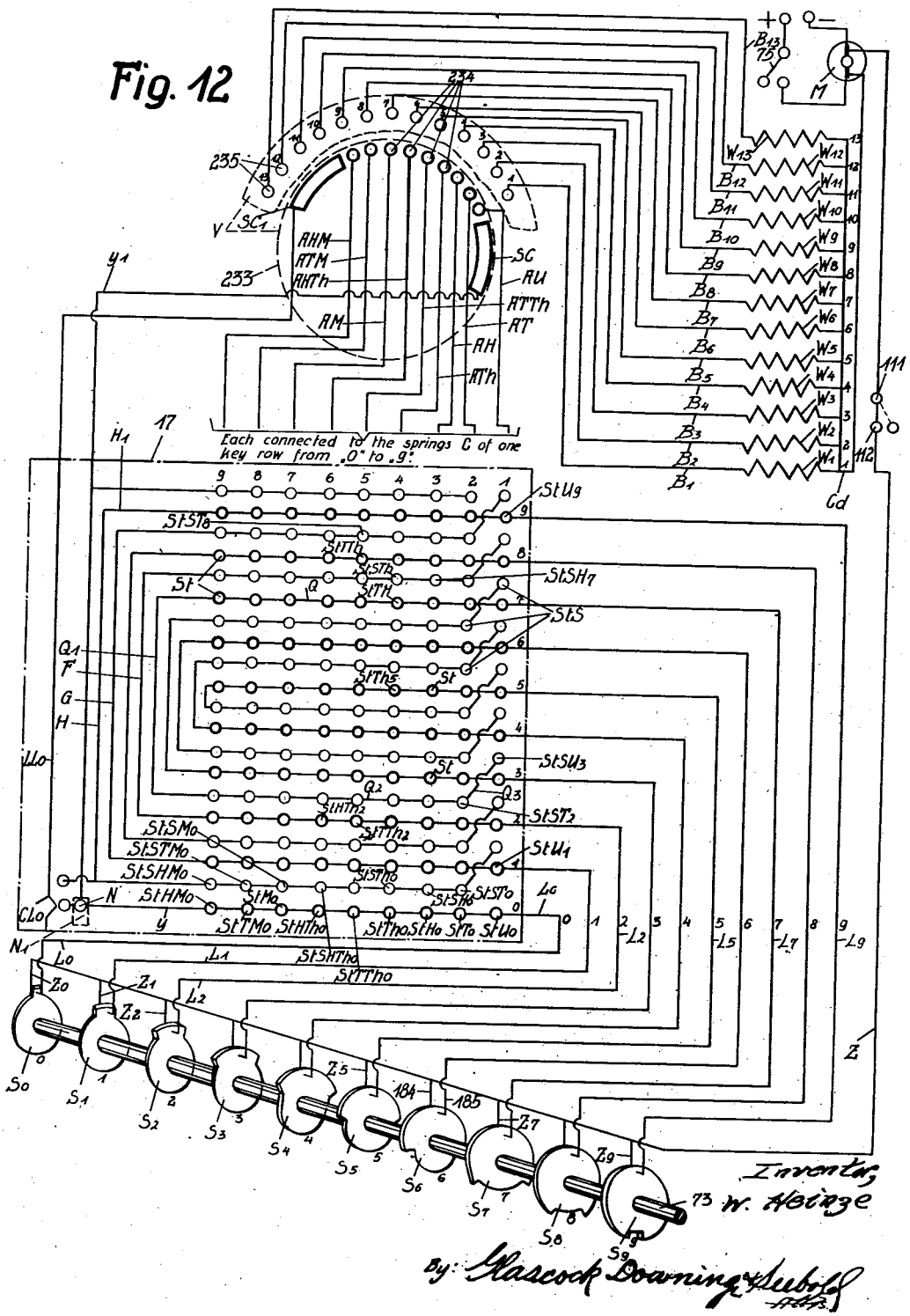

Patented Dec. 16, 1941

2,266,366

UNITED STATES PATENT OFFICE 2,266,366

ELECTRIC CALCULATING MACHINE

Werner Heinze, Zella-Mehlis, Thuringia, Germany, assignor to Mercedes Büromaschinen-Werke Aktiengesellschaft, Zella-Mehlis, Thuringia, Germany Continuation of application Serial No. 661,820, March 20, 1933. This application August 18, 1939, Serial No. 290,920. In Germany March 21, 1932

12 Claims. (Cl. 235—61)

This application is a continuation of my application Ser. No. 661,820, filed March 20, 1933 and relates to an electric calculating machine, which is not only driven by a motor but the values set up in the key board are also electrically transferred into the calculating mechanism. The machine performs all four kinds of calculations, multiplication as repeated addition and division as repeated subtraction. According to the invention, subtraction is also performed in the machine as addition while the value set up in the machine is automatically changed into its complementary number and is added. The advantages obtained by this method are very great. As the value of a vertically arranged series of keys is only led through an electric conductor, the complex and expensive transference mechanisms are eliminated, indeed, if required, the entire key board can be separated from the calculating mechanism. It is, however, especially important that in the different kinds of calculations, the totalizer does not require to be displaced. In this new machine, this function is performed by a simple switch which is easily reversed. The expensive totalizer carriage with its accurate guides and complicated moving mechanism is eliminated. The machine can thus be enclosed in a dust-tight manner, which is not possible with a displaceable carriage so that the machine is serviceable for a much longer period than the present machines. The speed of calculating is likewise high as the masses to be moved are small and also since the direction of rotation is the same in all kinds of calculations.

This is important in automatic division and abbreviated multiplication.

The most important consideration nevertheless is the cost of a calculating machine. By the simple construction of the calculating machine which does not require the greatest precision in its production and by the elimination of the carriage displacement as well as by the simple arrangement of the keys and the change over from positive and negative types of calculation, the production costs of the present machine are far beneath that of the usual machine. As the magnets only require a weak current for their operation, the contact transmission presents no difficulty. Also, the noise peculiar to calculating machines, due to special stops which prevent the over-running of the numeral wheels, is eliminated, for in the described machine, the driven calculating wheels are stopped by their being in engagement with the toothed driving segments, while the latter are stopped quite noiselessly at the right moment by the making alive of said magnets.

In the drawings, one embodiment of the invention is represented by way of example:

Figure 4 shows a section through the set of keys on the section line C—C viewed in the direction of the arorw B in Figure 1.

Figure 5 shows a perspective elevation of the tens-transfer mechanism, viewed from the front left-hand side of the machine.

Figure 10 shows the resetting mechanism viewed in the direction of the arrow B in Figure 1.

Figure 11 shows a second embodiment of the resetting mechanism viewed in the direction of the arrow B in Figure 1.

Figure 12 shows a diagrammatic view of the connections of the calculating machine.

Figure 15 shows a second form of execution of a detail.

Figure 1:
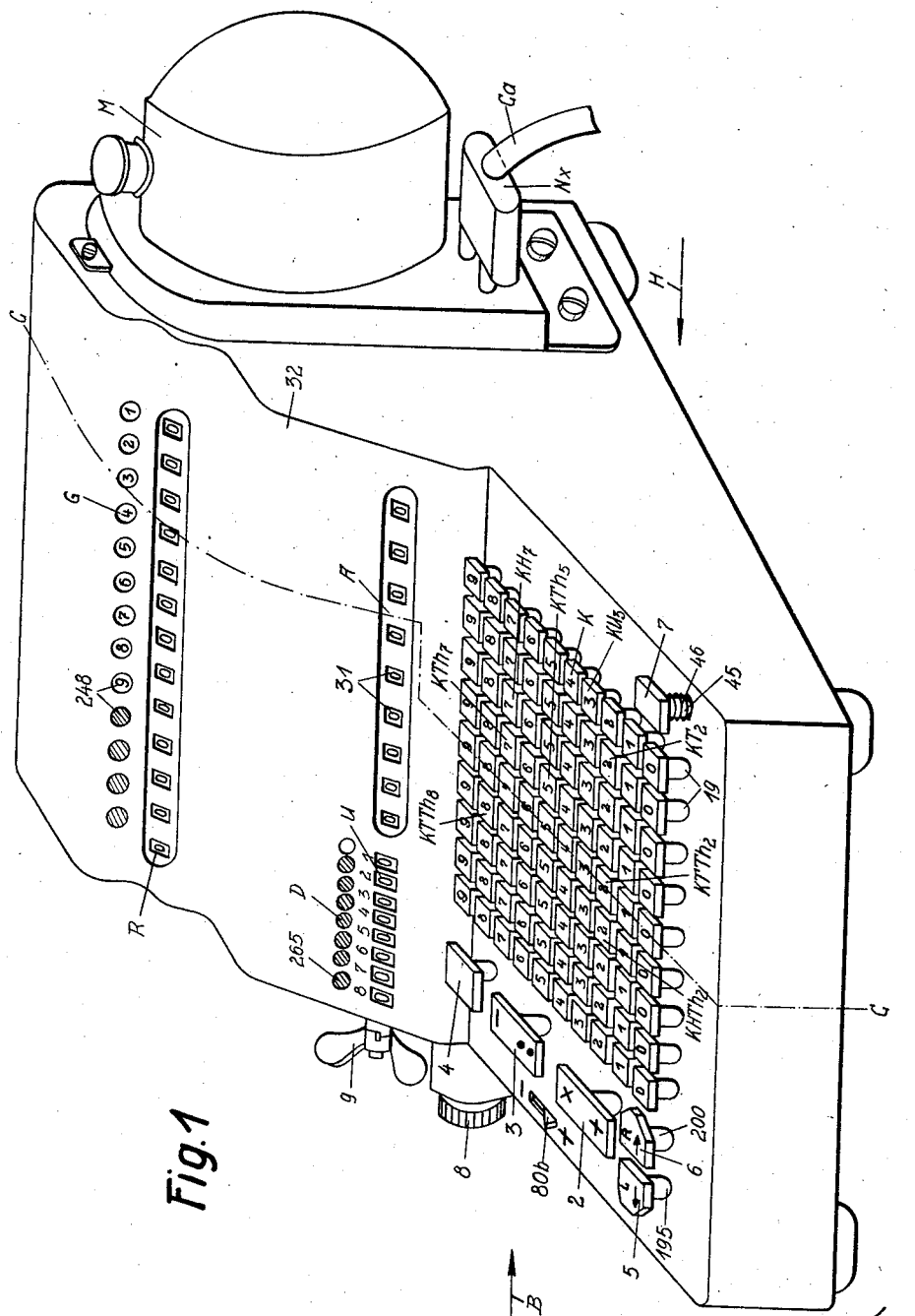
Figure 1 shows an elevation of the machine in perspective.
Figure 2:
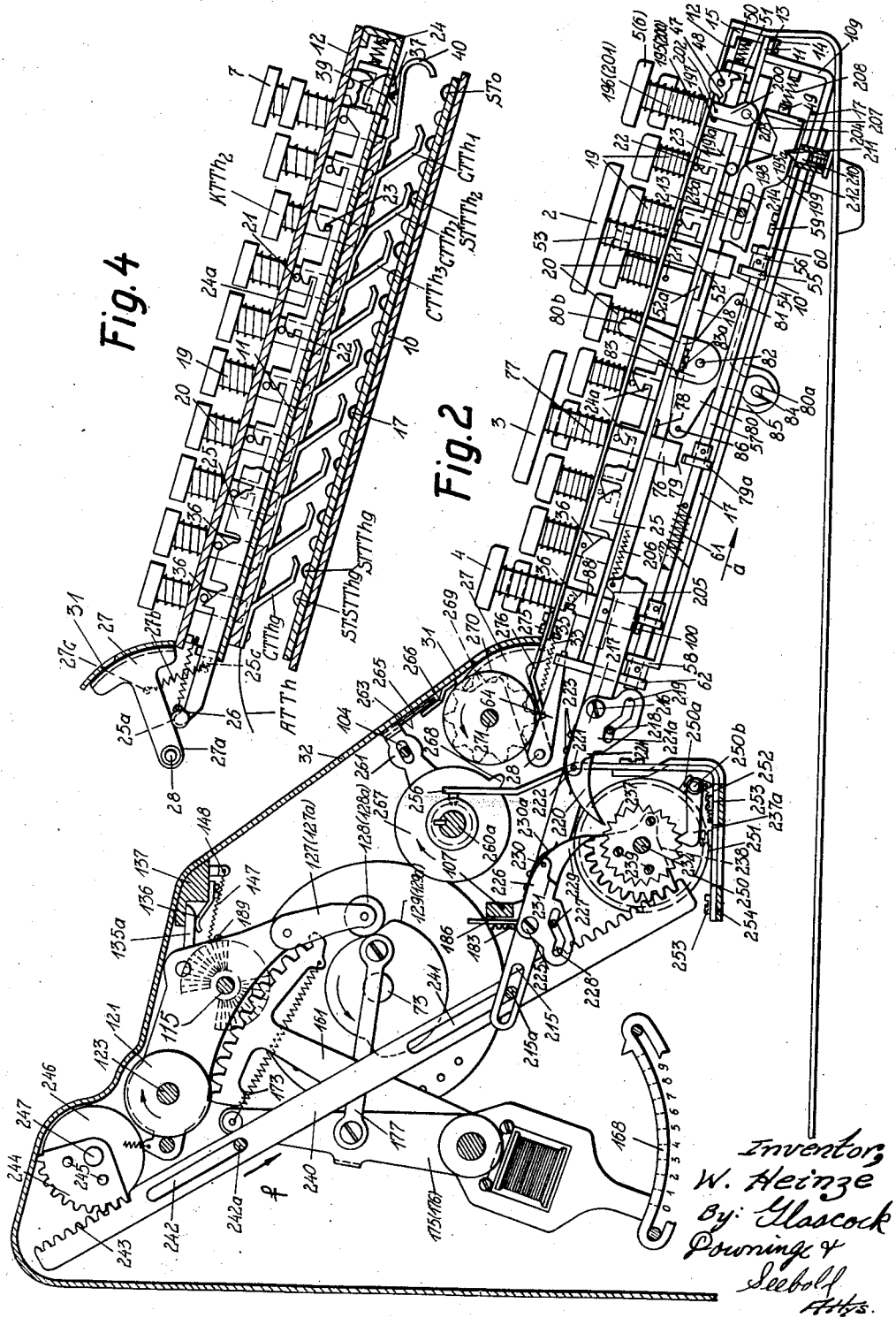
Figure 2 shows a side elevation viewed in the direction of the arrow B in Figure 1, the left hand side wall of the machine being removed for purposes of illustration.
Figure 3:
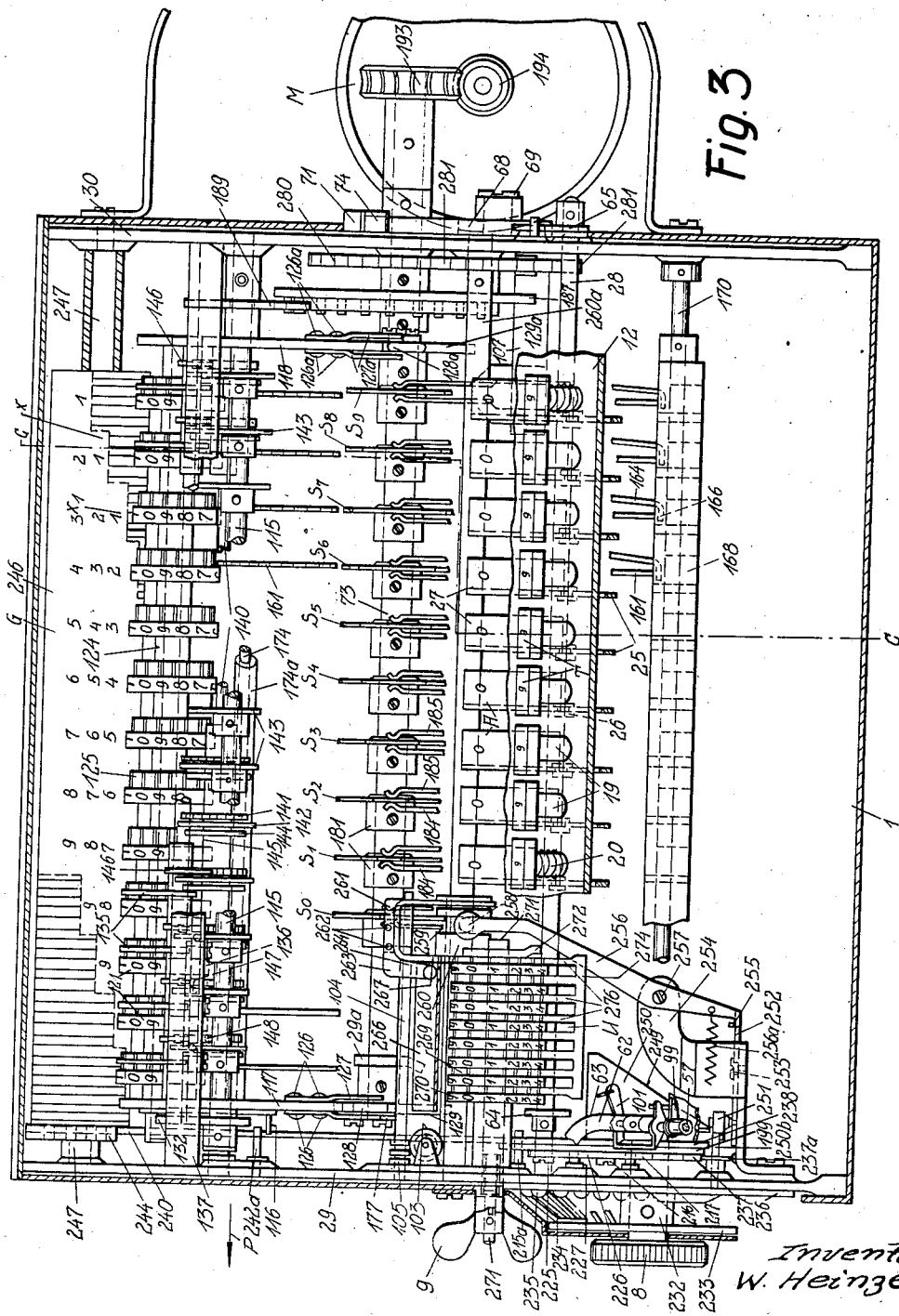
Figure 3 shows a front elevation of the machine, in which different parts of the mechanism are only partially shown in order to render other parts visible.

The machine consists of a housing 1, Figures 2 and 3, in which the set of keys K (Figure 1) is arranged. On the left beside the set of keys K, the function keys are disposed, namely, the addition and multiplication key 2, the subtraction and division key 3, the resetting key 4, for resetting the result register R to zero, the column-shifting key 5 on the left, and the column shifting key 6 on the right. On the right hand side of the machine beside the set of keys K, the cancelling key 7, for the set of keys K is arranged.

Above the set of keys K on the right hand side of the machine, the indicating mechanism A for the set of keys K, is disposed, and on the left hand side of the machine, beside the indicating mechanism A, the revolution counter U is arranged.

Above the revolution counter U, the column indicating mechanism D is arranged. The reference 8 indicates the rotatable knob for setting the column displacement and the reference 9 indicated the wing nut for resetting of the revolution counter U. Above the result register R, the column indicating mechanism G for the result totalizer R is arranged. Finally on the right-hand side, the motor M is arranged. By the reference Nx, the plug for the connecting cable Ca is indicated.

The key frame consists of three plates 10, 11 and 12, Figures 2 and 4, in which frame the lower plate 10 on its front and rear sides is constructed to form angle pieces of which the parts 13 thereof are fixed to the intermediate plate 11 by means of screws 14 (in Figure 2, the front connection only is represented). The intermediate plate 11 is constructed of a U-shape at its front and rear sides, and its parts 15 are fixed by means of screws 16, Figure 8 to the upper plate 12, so that the three plates 10, 11 and 12 form a rigid housing. The housing is fixed in a suitable manner with the remaining frame of the machine to be later described.

On the lower plate 10 a contact plate 17 is arranged so as to be displaceable in the direction of the arrow a and also in the direction opposite to that of the arrow a by means later described. On this contact plate 17, contact studs St (Figures 4 and 12) are arranged, from the contact studs St of which, represented with the filled-in circles, conductors L lead to insulating discs S, which are hereinafter described, while from the contact studs StS represented by hollow circles, electrical conductors lead to the contact studs St corresponding to the complement of the contact studs StS.

Figure 9:
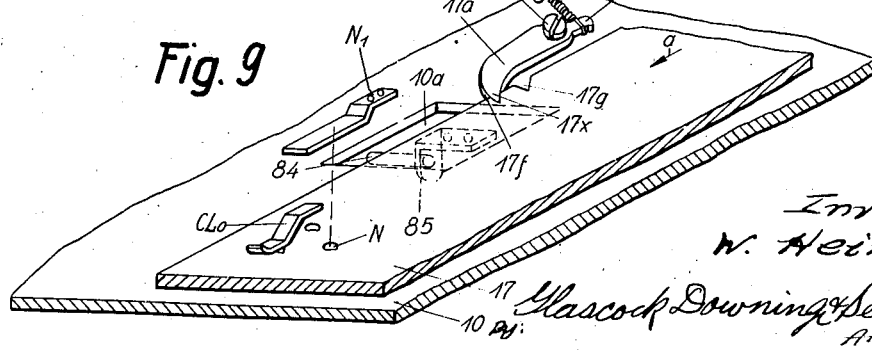
Figure 9 shows a perspective representation of the locking device for the displaceable contact plate.

On the lower side of the intermediate plate 11, of the key frame housing an insulating plate 18 carrying contact springs C is fixed. All contact springs C of one key row "0" to "9" are in electrical connection with one another, which connections AU (Fig. 12), AT, AH etc. lead to the contact springs 234 (Figures 3 and 12) of a distributor, described hereinafter in detail. The contact springs C are capable of co-operating, as will be later described in detail, at one time with the contacts St, of the contact plate 17, if the machine calculates in the positive sense, and at other times with the contacts StS of this plate, if the machine calculates in the negative sense. The contact plate 17 is held both in the positive and negative positions by a pawl 17a (Figure 9). The pawl 17a is fastened to the lower key frame plate 10 by means of a screw 17b and by means of a tension spring 17c which is fastened on the one side to a lug 17d formed on the pawl and on the other side to the stud 17e riveted to the plate 10, is held in one of the notches 17f or 17g provided in the contact plate 17. The incline of the wedge-shaped edges of the nose 17x of the pawl 17a and of the notches 17f and 17g is such that on displacement of the contact plate 17 in the direction of the arrow a, or in the opposite direction of the arrow a, the pawl 17a is pressed out of its actual notch.

The key stems 19 carrying the keys K are arranged in the upper and intermediate plates 12, 11, so as to be displaceable vertically. The keys K are held in their upper position (Figures 2, 4 and 8) by means of springs 20. In the key stems 19, pins 21 are arranged, which project through the key stems 19. The parts of the pins 21 projecting through the left-hand side of the key stems 19 (viewed from the front of the machine) act on inclined faces 22, of the locking bars 23 of which one is provided for each vertical row of keys. The locking bars 23 are guided in any suitable manner and are usually urged by a compression spring 24 in the opposite direction of the arrow a. Thus the inclines 22 of the locking bars lie against the pins 21 of the key stems 19, which again contact with the lower face of the plate 12, whereby the normal position of the locking bars 23 is determined. The locking bars 23 are further provided with recesses 24a, into which the pins 21 may enter on the depression of a key, and the keys K are thereby retained in their depressed position.

Beside the locking bars 23 (Figures 2 and 4), a slidable indicator bar 25 is arranged for each vertical row of keys, to each side of the rearwardly directed free ends of which a disc 26 is riveted. Between these discs 26, an indicator sector 27 is guided, which is pivotally mounted on a shaft 28. The bar 25 is provided between the discs 26 with a wedge-shaped end 25a with which the sector 27 is kept in permanent contact by means of a spring 27b arranged between the sector 27 and the bar 25. The shaft 28 is rotatably mounted in bearings in the two side walls 29 and 30 (Figure 3). On the front cover plate 32 is provided an inspection aperture 31 (Figs. 1 and 2). By means of springs 33, which on one side are attached to noses 34 of the indicator bars 25, and on the other side to the pins 35, fastened to the upper plate of the key frame housing, the indicator bars 25 are held in the direction of the arrow a, whereby their normal position is determined by the striking of their inclined faces 36 on the pins 21 of the key stems 19, which engage the under side of the plate 12 of the key frame support.

On the right-hand side of the key stems 19, for each series of keys is arranged a bar 37 (Figures 2 and 8), which is provided at its front end with a recess 38, into which an insulating piece 39 of a spring 40, fastened to the insulating plate 18, may enter. The bar 37 is usually held, i. e. when none of the keys T are depressed, in the opposite direction to the arrow a, by means of the spring 41, which on the one side is fastened to a pin 42, riveted to the bar 37 and on the other side is attached to a pin 43, arranged on the upper plate 12 of the key frame, whereby its normal position is determined by contact of the inclined faces 44 of the rail 37 against the pins 21, which project from the right side of the key stems 19, which pins 21 engage the under side of the upper plate 12.

The key stem 45 carrying the cancelling key 7 (Figure 1) arranged on the right hand side of the machine and vertically slidable in the upper plate 12 and intermediate plate 11, is held in its upper rest position by means of the spring 46. The pin 47 (Figure 2) riveted into the key stem 45, is capable of acting on a cam 49, which is pinned to the shaft 48. The shaft 48 is rotatably mounted in two brackets 48a fastened to the upper plate 12.

Further, on the shaft 48, nine cams 50, corresponding to the 9 key rows, are arranged, which, in a manner to be later described, are capable of acting on right angled bent lugs 51, of the locking bars 23.

The key stem 52 carrying the addition and multiplication key 2, which is vertically slidable in the upper and intermediate plates 12, 11 (Figure 2) of the key frame housing on the left hand side of the machine is held in its upper position by means of a spring 53 whereby the normal position is determined by the striking of the pin 52a against the intermediate plate 11 of the key frame housing. The lower edge 54 of the key stem acts on a lever 55, which, by means of the sleeve 56 provided on it, is fixed on the shaft 57. The shaft 57 is swingably mounted on the one side in the right-angled upwardly bent part 58 of the lower plate 10; and on the other side in an angle piece 60 attached to the lower plate 10 by means of screws 59. By means of a torsion spring 61 the shaft 57 is always acted upon in the direction of the arrow m indicated in Figure 2, whereby the lever 55 presses upwards against the key stem 52, and the normal position of the shaft 57 is determined.

Figure 7:
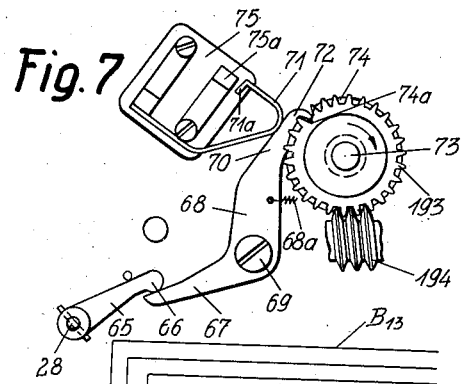
Figure 7 shows an elevation of the motor contact and motor drive viewed in the direction of the arrow H in Figure 1.

On the rearwardly directed part of the shaft 57, a lever 62 (Figures 2 and 3) is fixed, which is provided with an incline 63 corresponding to Figure 3, which is capable of co-acting with a lever 64 fixed on the shaft 28 on the left-hand side of the machine. Further, on the shaft 28 a lever 65 (Figures 2, 3 and 7) is fixed on the right hand side, the nose 66 (Figure 2) of which lever is capable of acting on the arm 67 of a two-armed lever 68. The lever 68 is swingably arranged on the right hand outer side of the wall 30, by means of a screw 69, and on the one side is capable of acting by means of its edge 70 on a contact spring 71, and on the other side by means of its nose 72 with a locking disc 74 fixed to the shaft 73 mounted on a bearing 29a on the left hand side wall and the side wall 30 of the machine. By means of a spring 68a, the lever 68 is always maintained in contact with the locking disc 74, whereby the normal position of the lever 68 is determined. The contact spring 71 is attached in any suitable manner to an insulating plate 75.

The key stem 76, which carries the subtraction and division key 3 is mounted so as to be displaceable vertically in the upper and intermediate plates 12 and 11 of the key frame body, is held by means of the spring 77 in its upper position, which is determined by the striking of the pin 78 against the intermediate plate 11. The key stem 76 is capable of acting by means of its lower edge 79, similarly to the addition key stem 52, on a lever 79a fixed on the shaft 57.

The pin 52a of the addition key stem 52 is capable, on the depression of the key 2, of acting on the pin 81 arranged on the shift cross 80, which is swingably arranged on the pin 82 riveted into the angle piece 83 (Figure 2), which is fixed by means of screws 83a to the intermediate plate 11.

The downwardly directed arm of the shift cross 80, which projects through a recess 10a (Figure 9) of the lower plate 10, is of forked construction and its mouth 80a embraces a pin 84 of an angle piece 85, which is fixed to the contact plate 17. The pin 78 of the key stem 76, of the subtraction key 3, acts on the pin 86 of the shift cross 80. By means of the alternate action of the addition key 2 and the subtraction key 3, on the shift cross 80, the contact plate 17, is acted upon at one time in the direction of the arrow a and at another time in the opposite direction of the arrow a. In the position represented in Figures 2 and 9, the contacts 17 and the shift cross 80 are in the addition position.

On the left hand side of the machine, the key stem 88 which carries the resetting key 4, is arranged so as to be displaceable vertically in the upper and intermediate plates 12 and 11 (Figure 10). By means of the spring 89, the key 4 is held in its upper normal position, which is determined by striking of the pin 90 against the lower face of the intermediate plate 11. If the key is in the depressed position represented by dotted lines in Figure 10, the part 94 of a pawl 92 which is swingably arranged by means of a screw 91 on the intermediate plate 11, is capable, under the action of the torsion spring 93 of entering the recess 95 of the key stem 88 and holding the key in its depressed position. The pawl 92 may co-act with the lever 64 by means of an incline (not represented) on the arm 92a.

The lower edge 96 of the key stem 88 co-acts with a lever 97 (Figure 10), which is fixed on a connecting bridge 98 loosely rotatable round the shaft 57. The lever 97 co-acts again with a stud 100, fixed on the lever 99. The lever 99 is fixed on the shaft 57. Further, on the connecting bridge 98, the lever 101 is fixed, on the free end of which a very yieldable wire 102 is fixed. This slides over the roller 103 arranged on the machine housing, over the roller 105 arranged on the shaft 104 fixed in the left-hand side wall 29, over the roller 106, which is arranged on a support 109 fixed by means of screw 108 to the bridge 107 and over the roller 110 arranged on the bridge 107. At the other end of the wire, the same is attached to an insulating piece 112a, provided on a contact spring 111, which normally, that is, when the resetting key 4 is not depressed, is in connection with a contact indicated by 112 in the connection diagram (Fig. 12). The contact spring 111 is fastened by means of a screw 111a to an angle piece 111b, which again by means of screws 111c is arranged on the bridge 107 attached to the side walls 29 and 30 of the machine, whereby the angle piece 111b by means of an insulating piece 117f is separated from the bridge 107. Further, to the lever 101, a wire 113 is attached, which slides over the rollers 103, 105 and over the roll 114 (Figure 10), which is loosely rotatable on a shaft 115, rotatably mounted in bearings on the side walls 29 and 30 of the machine. At its other end, the wire 113 is fixed to a lever 116, which again is fixed by means of the screw 120 to a shaft 119 swingably mounted in the side walls 117 and 118 (Figures 3 and 10). The shaft 119 is bevelled on its side facing the numeral wheels 121. Between the wire 113, a spring 122 is inserted, which is designed to fulfill an object to be described later. The numeral wheels 121 are loosely rotatable on a shaft 123, fixed in the totalizer frames 117, 118 and by means of the distance sleeves 124 (Figures 3 and 5) are prevented from axial displacement on the shaft 123. On the right-hand side of the numeral wheels 121, tooth wheels 125 are fixed, the purpose of which will be described later in a more detailed manner. On the side walls 117 and 118, of the totalizer frame, two arms 127, 127a are each fixed by means of rivets 126, 126a between which, by means of a headed rivet, the rollers 128 or 128a are rotatably mounted. The rollers 128 or 128a are each capable of acting with a cam 129 or 129a which are fixed to a shaft 73, rotatably mounted on the two side walls of the machine. By means of springs 131 (Figure 2), attached to the side walls 117, 118 the rollers 128 and 128a of the totalizer frame 117, 118 are always held in contact with the cams 129, 129a. A cam 132 (Fig. 10) arranged on the shaft 115, is also capable of co-acting in a manner later to be described, with the pin 133 riveted into the lever 116.

On the shaft 134, fixed in the side walls 117 and 118 (Figures 2 and 5), a detent 135 is arranged for each toothed wheel, which detents engage in the teeth of the toothed wheels 125 and hold these in the rest position of the totalizer frame 117, 118. The detents 135 are held by means of leaf springs 136, which are fastened by means of screws 138 to a bridge 137, fixed to the side walls 29 and 30. Into each of the numeral wheels 121, a pin 139 is riveted, which is capable of co-acting with a 16-toothed wheel 141 (Figures 2 and 5) loosely rotatable on a shaft 140 fixed in the side walls 117 and 118. With this toothed wheel 141, a four-toothed wheel 142, which is capable of co-acting with a cam 143, and also a four-toothed wheel 144 are rigidly fixed, the four-toothed wheel 144 being capable of co-acting with the toothed wheel 125 arranged on the numeral wheel 121 of the next higher decimal place. As is evident in Fig. 5, on the left of each numeral wheel 121, a set of three wheels 141, 142 and 144 is arranged which are prevented from axial displacement by means of the sleeves 145.

Further, on the shaft 134, detents 146 are swingably arranged and are acted on in the anti-clockwise direction by springs 147, the springs being connected on the one side to pins 148 arranged on the bridge 137 and on the other side to the noses 149, whereby the noses 150 of the detents are held in engagement with the teeth of the toothed wheels 141 and the latter are thereby prevented from unintentional rotational displacements. The cams 143 are arranged on the shaft 115 in the form of a spiral, so that they act consecutively on the four-toothed wheels 142. On the numeral wheel 121 in the units place, a pin 151 is riveted in the position corresponding to zero and in the remaining numeral wheels 121, pins 152 are riveted in positions corresponding to the "9" position, i. e. if the units numeral wheel 121 shows a "zero" at the inspection aperture and the remaining numeral wheels show a "nine," the pin 151 or the pins 152 must contact from below with the twist shaft 119. The pins 151 and 152 are capable of co-acting with the already mentioned shaft 119 in a manner to be described later.

A second form of construction of the resetting device will now be described. To this end, on the key stem 88, a part 153 (Figure 11) provided with an incline is arranged, which is capable of acting on a lever 154. The lever 154 is swingably mounted by means of the screw 155 on an angle piece 156 fixed to the left hand side wall 29 of the machine. On the upwardly directed arm of the two-armed lever 154, a pin 157 is fixed which projects into a ring groove, not shown, on a sleeve 159, which is fixed to the shaft 140 by means of the screw 158. The shaft 140 as well as the toothed wheels 141, 142 and 144 arranged on it with the distance rings 145, on the depression of the resetting key 4 are displaced to the left (Figure 5), whereby the studs 139 of the numeral wheels 121 come out of the working position in relation to the toothed wheels 141.

The resetting to zero is effected, therefore, without tens transfer mechanism. In this case, the cam 132, can be omitted as well as the stud 133, of the lever 116. The lever 116 can be formed according to Figure 11, as in this form of construction, the resetting to zero is attained without tens transfer. On a shaft 160, fixed in the two side walls, 29 and 30 (Figures 2 and 5) of the machine, toothed segments 161, constructed according to Figure 5 are swingably mounted, the teeth of which segments, in a manner to be later described in detail, are capable of engaging with the toothed wheels 125. As in the present machine, a 13 place calculating mechanism is provided, there are, therefore, 13 toothed segments arranged on the shaft 160. The toothed segments 161 are provided with openings 162 into which the magnets 163 project. The magnets 163 are fixed to an arm 164 in any suitable manner. The arm 164 is, by means of the screws 165, swingably arranged on a wire, not represented, and is so held by means of a spring (not shown) that its tooth-like part 166 is held out of engagement with the teeth 167 of the toothed guide 168. The tooth-like formed part 166 projects through the forked lower end of the arm 161. The toothed guide 168 is fixed to two shafts 169 and 170 fastened in the side walls 29 and 30 of the machine. As the machine, as has been mentioned above is one with thirteen decimal places in the guide 168, thirteen openings 171 are punched which are provided on the left-hand side with ten teeth corresponding to the numerals 0 to 9 of the numeral wheels 121. Further, on the guide 168, thirteen projections 172 are arranged which render impossible a further swinging out of the toothed segments 161. By means of the springs 173, which on one side engage with the toothed segments 161 and on the other side are attached to a shaft 174, the toothed segments 161 are always acted on in the anti-clockwise direction around the shaft 160, whereby they normally rest against the rubber rings 174a. Levers 175 and 176 are fastened one at each end of the shaft 160 and are connected by means of a rod 174, and are swingably mounted with the shaft 160.

To the lever 175 (Figure 2) a connecting rod 177 is jointed, which again at its free end is jointed to a cam 129. The cam 129 is fixed on the shaft 73 on the left-hand side of the machine and the cam 129a on the right-hand side of the machine.

It may be remarked that the toothed segment 161 can also be formed as a double-sided toothed segment 161 (Figure 15). In this case, the teeth 161a are formed on the downwardly directed part of the toothed segment 161, as shown in Figure 15 whereby a secure engagement of the teeth 161b of the pawl 161e is obtained. The pawl 161c is swingably mounted on a suitably mounted pin 161d and is formed out of non-conducting material. On the pawl 161c, a metallic member 161f is provided, which is capable of co-acting with the magnet 161g. The remaining parts are formed exactly as in the first form of construction. The forward edge 161h strikes, if the toothed segments swings through ten units, which is the case when the numeral wheels are rotated from "0" to "0," on the stop 172, which, in this example of construction, is correspondingly displaced.

On the shaft 73 (Figures 3, 12), ten insulated discs S, corresponding to the values "0" to "9," are rigidly fixed by means of bushes 181 fixed responding to the 9 key rows, are arranged, which, in a manner to be later described, are capable of acting on right angled bent lugs 51, of the locking bars 23.

The key stem 52 carrying the addition and multiplication key 2, which is vertically slidable in the upper and intermediate plates 12, 11 (Figure 2) of the key frame housing on the left hand side of the machine is held in its upper position by means of a spring 53 whereby the normal position is determined by the striking of the pin 52a against the intermediate plate 11 of the key frame housing. The lower edge 54 of the key stem acts on a lever 55, which, by means of the sleeve 56 provided on it, is fixed on the shaft 57. The shaft 57 is swingably mounted on the one side in the right-angled upwardly bent part 58 of the lower plate 10, and on the other side in an angle piece 60 attached to the lower plate 10 by means of screws 59. By means of a torsion spring 61 the shaft 57 is always acted upon in the direction of the arrow m indicated in Figure 2, whereby the lever 55 presses upwards against the key stem 52, and the normal position of the shaft 57 is determined.

On the rearwardly directed part of the shaft 57, a lever 62 (Figures 2 and 3) is fixed, which is provided with an incline 63 corresponding to Figure 3, which is capable of co-acting with a lever 64 fixed on the shaft 28 on the left-hand side of the machine. Further, on the shaft 28 a lever 65 (Figures 2, 3 and 7) is fixed on the right hand side, the nose 66 (Figure 2) of which lever is capable of acting on the arm 67 of a two-armed lever 68. The lever 68 is swingably arranged on the right hand outer side of the wall 30, by means of a screw 69, and on the one side is capable of acting by means of its edge 70 on a contact spring 71, and on the other side by means of its nose 72 with a locking disc 74 fixed to the shaft 73 mounted on a bearing 29a on the left hand side wall and the side wall 30 of the machine. By means of a spring 68a, the lever 68 is always maintained in contact with the locking disc 74, whereby the normal position of the lever 68 is determined. The contact spring 71 is attached in any suitable manner to an insulating plate 75.

The key stem 76, which carries the subtraction and division key 3 is mounted so as to be displaceable vertically in the upper and intermediate plates 12 and 11 of the key frame body, is held by means of the spring 77 in its upper position, which is determined by the striking of the pin 78 against the intermediate plate 11. The key stem 76 is capable of acting by means of its lower edge 79, similarly to the addition key stem 52, on a lever 79a fixed on the shaft 57.

The pin 52a of the addition key stem 52 is capable, on the depression of the key 2, of acting on the pin 81 arranged on the shift cross 80, which is swingably arranged on the pin 82 riveted into the angle piece 83 (Figure 2), which is fixed by means of screws 83a to the intermediate plate 11.

The downwardly directed arm of the shift cross 80, which projects through a recess 10a (Figure 9) of the lower plate 10, is of forked construction and its mouth 80a embraces a pin 84 of an angle piece 85, which is fixed to the contact plate 17. The pin 78 of the key stem 76, of the subtraction key 3, acts on the pin 86 of the shift cross 80. By means of the alternate action of the addition key 2 and the subtraction key 3, on the shift cross 80, the contact plate 17, is acted upon at one time in the direction of the arrow a and at another time in the opposite direction of the arrow a. In the position represented in Figures 2 and 9, the contacts 17 and the shift cross 80 are in the addition position.

On the left hand side of the machine, the key stem 88 which carries the resetting key 4, is arranged so as to be displaceable vertically in the upper and intermediate plates 12 and 11 (Figure 10). By means of the spring 89, the key 4 is held in its upper normal position, which is determined by striking of the pin 90 against the lower face of the intermediate plate 11. If the key is in the depressed position represented by dotted lines in Figure 10, the part 94 of a pawl 92 which is swingably arranged by means of a screw 91 on the intermediate plate 11, is capable, under the action of the torsion spring 93 of entering the recess 95 of the key stem 88 and holding the key in its depressed position. The pawl 92 may co-act with the lever 64 by means of an incline (not represented) on the arm 92a.

The lower edge 96 of the key stem 88 co-acts with a lever 97 (Figure 10), which is fixed on a connecting bridge 98 loosely rotatable round the shaft 57. The lever 97 co-acts again with a stud 100, fixed on the lever 99. The lever 99 is fixed on the shaft 57. Further, on the connecting bridge 98, the lever 101 is fixed, on the free end of which a very yieldable wire 102 is fixed. This slides over the roller 103 arranged on the machine housing, over the roller 105 arranged on the shaft 104 fixed in the left-hand side wall 29, over the roller 106, which is arranged on a support 109 fixed by means of screw 108 to the bridge 107 and over the roller 110 arranged on the bridge 107. At the other end of the wire, the same is attached to an insulating piece 112a, provided on a contact spring 111, which normally, that is, when the resetting key 4 is not depressed, is in connection with a contact indicated by 112 in the connection diagram (Fig. 12). The contact spring 111 is fastened by means of a screw 111a to an angle piece 111b, which again by means of screws 111c is arranged on the bridge 107 attached to the side walls 29 and 30 of the machine, whereby the angle piece 111b by means of an insulating piece 117f is separated from the bridge 107. Further, to the lever 101, a wire 113 is attached, which slides over the rollers 103, 105 and over the roll 114 (Figure 10), which is loosely rotatable on a shaft 115, rotatably mounted in bearings on the side walls 29 and 30 of the machine. At its other end, the wire 113 is fixed to a lever 116, which again is fixed by means of the screw 120 to a shaft 119 swingably mounted in the side walls 117 and 118 (Figures 3 and 10). The shaft 119 is bevelled on its side facing the numeral wheels 121. Between the wire 113, a spring 122 is inserted, which is designed to fulfill an object to be described later. The numeral wheels 121 are loosely rotatable on a shaft 123, fixed in the totalizer frames 117, 118 and by means of the distance sleeves 124 (Figures 3 and 5) are prevented from axial displacement on the shaft 123. On the right-hand side of the numeral wheels 121, tooth wheels 125 are fixed, the purpose of which will be described later in a more detailed manner. On the side walls 117 and 118, of the totalizer frame, two arms 127, 127a are each fixed by means of rivets 126, 126a between which, by means of a headed rivet, the rollers 128 or 128a are rotatably mounted. The rollers 128 or 128a are each capable of acting with a cam 129 or 129a which are fixed to a

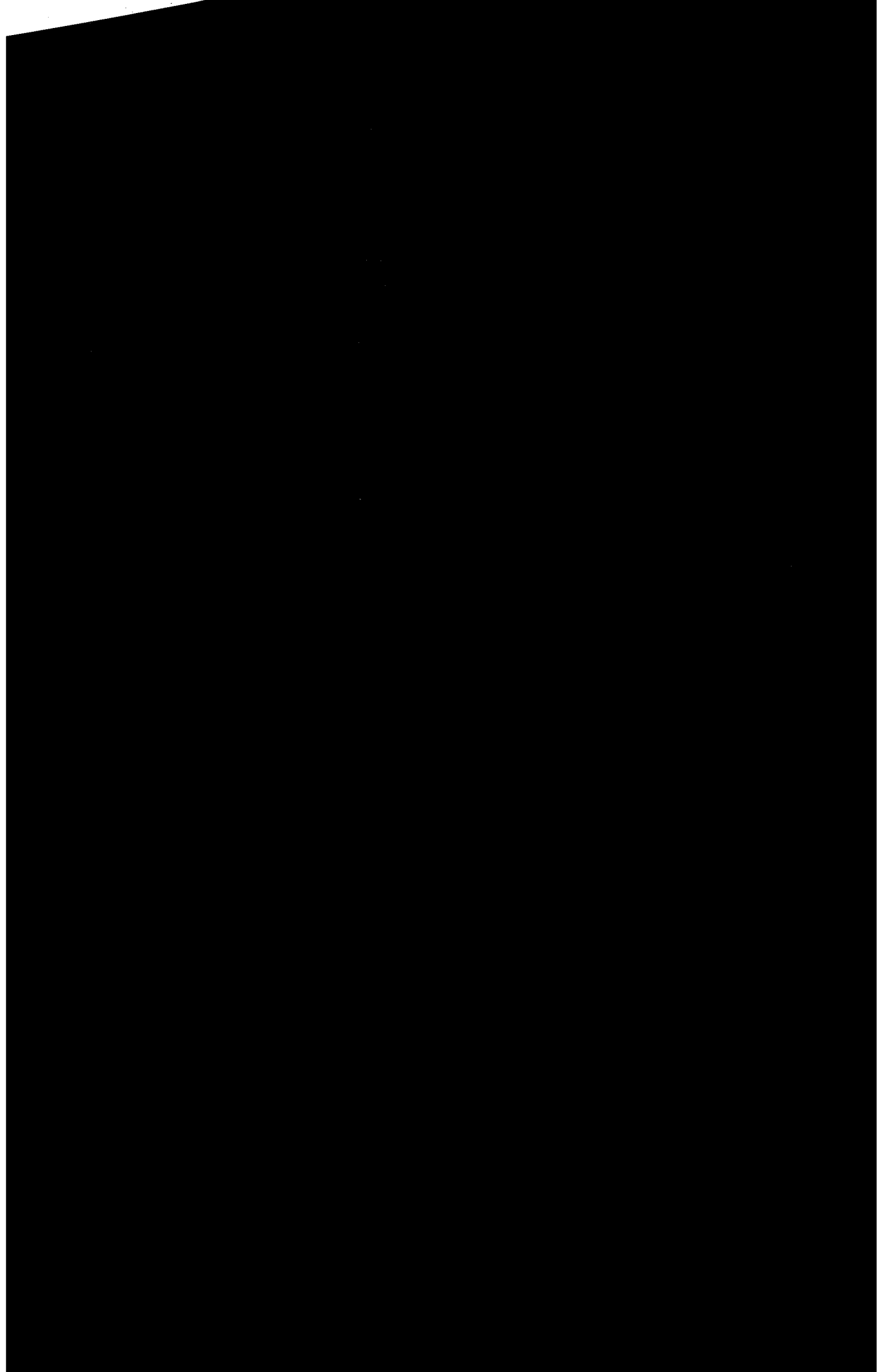

to the shaft. On a bridge 107 fixed to the two side walls 29 and 30 of the machine, contact springs 184 and 185 are fastened by means of the screws 183. Between the bridge 107 and the contact springs 184 and 185 an insulated strip 196 is arranged. The contact springs 185, as is evident from the diagram of connections in Figure 12, are jointed to the negative conductor Cd and the contact springs 184 to the positive conductor Z.

Figure 6:
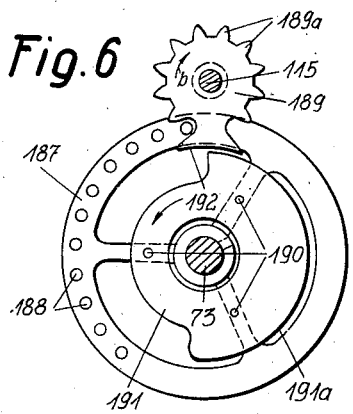
Figure 6 shows a view of the Maltese drive for the tens transfer.

Further, on the shaft 73, the pin wheel 187 (Figures 2, 3 and 6) is fastened. Eleven pins 188 are riveted into the pin wheel 187 and are capable of coacting with the teeth 189a of the Maltese cross 189 fixed to the shaft 115. Further, on the pin wheel 187, a slide disc 191 is fixed by means of rivets and this disc co-acts with the face 192 of the Maltese cross and prevents the rotation of the latter.

Moreover, on the shaft 73 (Figures 2, 3, 6 and 7), the worm wheel 193 is fixed and engages with the worm 194 of the driving motor M.

On the left-hand side of the machine, the column left displacement key 5 (Figures 1 and 2) is arranged and is fixed to the key stem 195 which is guided in the upper plate 12. The key 5 is held in its upper normal position by means of the spring 196, this position being determined by impact of the pin 197 upwards against the plate 12. The lower part of the key stem 195 is bent at right angles. To this right-angled bent part 195a, a pin 197a is riveted which is capable of acting on an incline 198 of the slide 199.

To the right of the column left displacement key 5, the column right displacement key 6 (Figure 1) is arranged and is fastened to the key stem 200. The key 6 is held in its upper normal position by means of the spring 201, this position being determined by the impact of the pin 202 upwards against the plate 12. To the downwardly directed part of the key stem 200, a pin 203 is riveted, and this pin is capable of acting on an inclined face 204 of the slide 199.

To the nose 205 of the slide, a spring 206 is attached, the other end of the spring being connected in a suitable manner to a pin (not shown) which is fastened to the plate 11. Further between the bent end 207 of the slide 199 and the part 10g of the plate 10, a compression spring 208 is arranged in a suitable manner. The tension spring 206, which acts on the slide 199 in the direction of the arrow a, and the compression spring 208, which acts on the slide 199 in the opposite direction to the arrow a, are so designed that they balance one another, whilst they only come into operation when the slide 199 is disposed in one of the displaced positions. In the normal position of the slide 199, an arresting pin 210 is capable of entering into a stop 211 of the slide 199, and holding this in its normal position. If the slide 199 is displaced to the left or the right, the pin 210 slides along on the lower edge 212 of the slide 199.

The slide 199 is displaceably arranged in the bent lug 213 in the plate 11 (Figure 2) by means of a headed screw 213a, which projects through the slot 214 of the slide 199. Further, the slide 199 is displaceably mounted at its other end on the left-hand side wall 29, by means of a headed screw 215a, which projects through the slot 215 of the slide. By means of the screw 216, a pawl 217 is swingably arranged on the slide 199. The pawl 217 is by means of the pin and slot-arrangement 218, 219, positively guided. Here the pin is fixed in the left-hand side wall 29 of the machine. The forward part 220 of the pawl 217 is, by means of the rivet 221, swingably mounted on the fixed part 221a of the pawl 217 and is normally held so swung by means of the leaf spring 222 which is fastened to the fixed part 221a of the pawl 217 by rivets 223, that its edge 224 lies against the fixed part 221a of the pawl 217.

Further, on the slide 199, a second pawl 226 is fastened. This is likewise positively guided by means of the pin and slot connection 227, 228. The forward part 229 is swingably arranged on the pawl 226 by means of the rivet 230. By means of a leaf spring 230a, which is riveted to the pawl 226, the movable part 229 of the pawl 226 is acted on in the clockwise direction round the pin 230, whereby its edge 231 lies against the pawl 226. The pin 232 (Figs. 2 and 3) is rotatably arranged in the machine side wall 29 on the left hand side. On this pin, a milled knob 8 is rigidly mounted, the knob being in fixed connection with the rotatable part 233 of a distributor. The rotatable part 233 of the distributor is rigidly mounted on the pin 232. On the rotatable part 233 of the distributor, nine contact springs 234 (Figure 3) are provided, which, as is shown in the connections diagram (Figure 12) by means of conductors A are in connection with the nine corresponding key rows. On the rotatable part 233 of the distributor, are further arranged two broad contact springs, Sc and Sc1 (Figure 12), which slide simultaneously over several contact studs 235 (Figures 3, 12). The contact studs 235 are fastened to an insulated plate 236 and, as is evident from the connections diagram in Figure 12, are connected with the coils W1 to W13 of the magnets 163.

On the same pin 232, which projects on the right of the left-hand side wall 29, a toothed wheel 237 (Figures 2 and 3) is fixed, with which the above-mentioned pawls 217 and 226 are capable of co-acting. To the right of this toothed wheel 237 and to the same, a ten-toothed sector 238 is fastened by means of the screws 239. The toothed sector 238 is in engagement with a rack corresponding to the rack 240 in Figure 2.

The rack 240 is slidably mounted on one side by means of the headed screw 215a, screwed into the left-hand side wall and projecting through the slot 241 and on the other side by a headed screw 242a, which projects through the slot 242 of the rack 240. On the upwardly directed end of the rack 240, teeth 243 are likewise provided which are in engagement with a toothed sector 244. The toothed sector 244 is fixed by means of screws 245 to a drum 246, which is rotatable on the shaft 247 which is mounted in the two side walls 29 and 30. On the circumference of the drum 246, the numbers "1" to "9" are applied corresponding to the nine vertical key rows, displaced through one division in eight-fold recurrence. In the inspection apertures 248, always after positioning of the drum 246, the numbers from 1 to 9 in the units place, tens place and so forth are beginning to show, and in the remaining right or left inspection apertures, a white field, which in Figure 3 is indicated with vertical hatched lines.

On the shaft 232 is fixed a drum 250, provided with an inclined face 249. The inclined face 249 acts here on a roller 251 (Figure 3), which is arranged on the slide 252. The slide 252 is displaceably arranged by means of the screws 253 (Figures 2 and 3) on an angle piece 254, arranged in the machine house in any suitable manner. The end of the slide 252 co-acts with a flange 255 of the two-armed lever 256, which is swingably arranged on the angle piece 254 by means of the screw 257. On the upwardly directed end of the two-armed lever 256, a pin 258 is riveted which engages in a ring groove 259 of a sleeve 260, which is slidably but non-rotatably arranged on the shaft 260a. On one of the sides of the sleeve 260, an angle piece 261 is rotatably mounted, on the free end of which an indicator 263 is fixed by means of rivets 262, the indicator being provided with a white spot or small white plate 264, and is recognisable in the inspection apertures 265 of the indicator mechanism D. On the cover plate 32, below all the inspection apertures 265, of the revolution counter, a black plate 266 is fixed in any suitable manner, which likewise in the inspection apertures 265 is visible and can be covered by means of the white spot 264 of the indicator 263.

On the shaft 260a, a cam disc 267 is further slidably but non-rotatably arranged on the sleeve 260. The cam 268 of the cam disc 267 is capable of co-acting with the individual toothed wheels 269. The toothed wheels 269 are fixed to the numeral wheels 270 of the revolution counter U. The toothed wheels 269, just as the numeral wheels 270, are loosely rotatable on the axle stud 271 arranged on the left-hand side wall 29 of the machine. By means of the fork 272 which is arranged in any suitable manner, the numeral wheels 270 and the toothed wheels 269 are prevented from sliding off from the stud 271. On the axle stud 271, a wing nut 9 is further arranged. In order to avoid an unintentional displacement of the numeral wheels 270 of the revolution counter U, a spring comb 274 is fastened to the key frame plate 12 by means of screws 275, the single springs 276 which are in engagement with the toothed wheels 269. On the right-hand side of the shaft 73 (Figure 3), a toothed wheel 280 is rigidly mounted, which is in engagement with the toothed wheel 281 fixed on the shaft 260a, by which means the shaft 260a obtains its drive.

The manner of operation of the invention will now be explained by the aid of an example, and the following calculation will be undertaken by the machine.

$$+225000$$
$$-87000$$
$$\overline{\phantom{00000}}$$
$$13800$$
$$-723$$
$$\overline{\phantom{00000}}$$
$$137277$$

To this end, it is first necessary to set up the value "225000" in the set of keys, which is effected by depression of the corresponding keys.

In order to elucidate the connections diagram, it may be remarked that in the following description, the contact springs are denoted by C (Fig. 8) the contact studs by St (Fig. 12) and the keys in general by K. The reference letters U, T, H, Th, T, Th and so forth behind the named reference characters C, St, or K designate the key series, e. g. units place tens place and so forth.

The indexes 1, 2, 3 and so on designate the corresponding value of the depressed key. As in the units, tens and hundreds places, zeros are not calculated, so in these places no key is depressed and, therefore, no displacement of the corresponding bar 37 (Figure 8) takes place. The bars 37 act, therefore, with faces 37a on the insulated pieces 39 of the contact springs 40 and hold these in this manner in contact with the contact studs StUo, StTo and StHo (Figure 12). Consequently, in the units place, the circuit Z, ZoSo, Lo, StUo, 40 (Fig. 8), AU (Fig. 12) B1, W1 and Cd remains closed at StUo, 40, in the tens place, the circuit Z, ZoSo, Lo, St To, 40, AT, B2, W2, Cd remains closed at StTo and in the hundreds place, the circuit Z, Zo, Lo, StHo, 40, AH, B3 W3 and Cd remains closed at StHo, 40. As in the thousands place, the key KTh5 (Figure 1) is depressed, so the contact spring CTh5 belonging to the key KTh5 comes into contact with the contact studs StTh5, of the thousands place, it being assumed that the contact plate 17 carrying the contact studs StU 1—9, StT 1—9, is in the addition position i. e., contact studs StU1—9 is in the addition position, i. e., contact studs StU1—9, StT1—9 etc. which are indicated with full circles in Figure 12, comes in contact with the contact springs CU1—9, CT1—9 etc. Here, the circuit Z, Z5, L5, StTh5, CTh5, ATh5, B4, W4 and Cd is closed preparatorily.

On the depression of the key KTTh2 (Figures 1 and 4) in the ten thousands place corresponding to the value 2 the contact CTTh2 belonging to the key KTTh2 comes in contact with the contact stud StTTh2, whereby the circuit (Figure 12) Z, Z2, L2, StTTh2, CTTh2 (Fig. 4), ATTh (Figs. 4 and 12), B5, W5 and Cd is preparatorily closed.

On the depression of the key KHTh2 in the hundred thousands place, corresponding to the value 2, the contact spring CHTh2, comes into contact with the contact stud StHTh2, whereby the circuit Z, Z2, L2, StHTh2, CHTh2, AHTh, B5, W6, Cd is preparatorily closed. As in the remaining three key rows to the left, no value is set, so the springs 40, as already was described above for the three right-hand key rows, connect the coils 163 (Figures 2 and 5) of the seventh to the ninth place of the result register A with the contact studs StMo, StTMo and StHMo which are associated with the spring 185 (Figure 3) of the zero disk So. The remaining four calculating places to the left of the result register R10—R13, which are not in connection with one of the nine vertical key rows, obtain their current through the contact spring CLo, (Figures 9 and 12), whereby the following circuits are preparatorily closed Z, ZoSo, Lo, CLo, LLo, SC1, B10, W10, Cd; Z, ZoSo, Lo, CLo, LLo, SC1, B11, W11, Cd; Z, ZoSo, Lo, Clo, LLo, SC1 B12, W12, Cd and finally Z, ZoSo, Lo, CLo, LLo, SC1, B13, W13, Cd.

Figure 8:
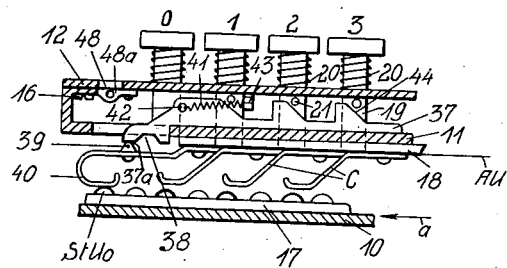
Figure 8 shows a part elevation of the set of keys, of the units place viewed in the direction of the arrow H in Figure 1.

In consequence of the depression of the keys KTh5, KTTh2, and KHTh2, Figure 1, against the action of their spring 20, Figure 8, the pins 21 riveted to the key stems 19 act on the inclined faces 44 of the corresponding bars 37 of the thousands place, of the ten thousands place and of the hundred thousands place, whereby these are displaced in the direction of the arrow a (Figure 8) against the action of their springs 41. In this displacement of the bars 37, the corresponding contact springs 40 with their insulated piece 39 spring into the notches 38 (Fig. 4) of the bars 37. Whereby the contact springs 40 of the corresponding key rows with their corresponding contact studs StTho, StTTho and StHTho are put out of contact, so that the corresponding circuits are interrupted by the contact springs 40 while, as hereabove described, the circuits over the contact springs CT*hs*, CTT*h*2 and CHT*h*2 are closed.

After the circuits, which are closed or interrupted when the figure "225000" is registered in the set of keys, have been thus described, I shall now describe the mechanisms which are also activated by depressing the keys KT*h*5, KTT*h*2 and KHT*h*2.

On depressing, the key KT*h*5 which corresponds to the value 5 in the thousands place, the pin 21 which is riveted on the key stem 19 acts upon the oblique surface 36 (Figure 2) of the indicator bar 25, which lies under the key pin and displaces the same contrary to the pressure of its spring 33. This causes the upper edge 25a (Figure 4) of the left end of the indicator bar 25 which is slightly bent upwards, to act from underneath against the edge 27a of the indicator sector 27 and, therefore, pivots the latter in the anti-clockwise direction round the shaft 28 and against the action of the spring 27b, which is connected on the one side to the pin 27c of the indicator sector 27 and on the other side to the pin 25c of the plate 11, and this pivoting movement causes the indicator sector 27 to exhibit a "5." In the same way, the key pins 21 of the key KTT*h*2 of the ten thousands place and the key KHT*h*2 of the hundred thousands place act upon the corresponding inclined surfaces 36 of the indicator bars 25, so that the indicator sector 27 of the ten thousands place will register a "2" and the indicator sector 27 of the hundred thousands position also a "2."

Besides this, the pins 21 of the keys KT5, KTT*h*2 and KHT*h*2, on being pressed down, will act upon the inclined surfaces 22 (Figures 2 and 4) of the locking bars 23 of the corresponding calculating places, which causes them to be displaced contrary to the action of their springs 24. When the keys KT*h*5, KTT*h*5 and KHT*h*2 have reached their lowest position, the locking bars 23, through the action of their springs 24, will spring to the left (Figures 2, 4), the pins 21 engaging into the notches 24a of the locking bars 23 and holding in this way the keys KT*h*5, KTT*h*2 and KHT*h*2 in their depressed position.

At this juncture, the addition key 2 is depressed against the action of its spring 53. This causes the key stem 52 to act upon a lever 55 which is fixedly arranged on the shaft 57, so that the shaft 57 will pivot against the pressure of a torsion spring 61 in the clockwise direction (Figures 2 and 3). A lever 62 which is fixed to the shaft 57 will act with its inclined surface 63 upon a lever 64 which is arranged on the shaft 28 which is pivotably arranged in the two side walls 29, 30 of the machine. A lever 65 which is arranged on the right side of the machine (Figures 3 and 7) on the shaft 28, on being rocked in the anti-clockwise direction (Figure 2), acts with its nose 66 on a two-armed lever 68 which is pivotably arranged on the screw 69 which is affixed to the right side wall 30 of the machine, and pivots this lever in the clockwise direction (Figure 2) against the action of the spring 68a. This lever acts with its face 70 on a contact spring 71 which comes into contact with its section 71a with the contact member 75a, thus closing the circuit (Figure 12). As on the circuit being closed the nose 72 of the lever 68 releases the cam 74a of the locking disc 74 which is rigidly arranged on the shaft 73. Upon release of the disc 74, the worm 194 drives the shaft 73 through the worm in wheel 193 in the direction of the arrow shown in Fig. 2.

Immediately after the starting of the revolution of the shaft 73, the cams 129 and 129a (Figures 2 and 3), which are fixed on the shaft 73, near the ends thereof will act upon the rollers 128, 128a which are arranged on the frame 117, 118 which carries the result register numeral wheels 121 and the tens transfer mechanism. Consequently, the frame 117, 118 which is rotatably arranged on the stationary shaft 115, is rocked in the anti-clockwise direction against the action of the spring 131. This causes the toothed wheels 125, which are fixedly connected with the number rollers 121 of the result totalizer R, to engage with the teeth of the toothed segments 161.

During the rocking movement of the frame 117, 118, the detents 135, which are held by the springs 136, with their arms 135a, constantly against the detent bar 137, will remain in touch with the detent bar 137 and the noses 135c which are arranged on the arms 135b of the detents 135 will disengage from the toothed wheels 125, so that the numeral wheels 121 which are rigidly connected with them will be able to move freely under the influence of the toothed segments 161.

Now the insulator disc So which corresponds to the value "0" will release the contact springs 184, 185 and this will definitely close the circuit. In consequence of this, the magnet 163 in the units place will attract the arm 164, thus causing the latter to engage with its bent and tooth-shaped part 166 with the first tooth of the rack 168, which tooth corresponds to the value "0." This prevents the numeral wheel 121 of the units place from being rotated. As furthermore no key K has been depressed in the tens and the hundreds places, the circuit to the magnets in these places will also be closed at the same time as in the units place, the corresponding magnets 163 attracting the arms 164, so that the tooth-shaped part 166 will engage with the first tooth of the rack 168 in such a way that the toothed segments 161 are prevented from rotating and the numeral wheels 121 register a zero.

As, as has been already stated, the springs 40 (Fig. 8) in the three left rows of keys, connect the magnets 163 of the seventh to ninth place of the result register R with the contacts S*t*Mo, S*t*TMo and S*t*HMo (Fig. 12) which are connected with the springs 184, 185, of the insulator disc So, the insulator disc So, after a short rotation, will release the springs 184, 185 and this will close the circuits and the magnets 163 will attract the arms 164, causing the tooth-shaped flanges 166 of the arms 164 to mesh with the first tooth of the rack 168, preventing the toothed segments 161 of the seventh to ninth place from rotating further. As the contact segment SCI (Fig. 12), by means of the lead LLo, the contact spring CLo and the lead y, is also connected to the lead Lo, it is obvious that the operation of the magnets 163 of the tenth to thirteen place is exactly the same as for the seventh to ninth place, that is to say, all numeral wheels 121 of the seventh to thirteenth place exhibit zeros.

After further rotation of the shaft 73 in the direction of the arrow shown in Figure 2, the frame 175, 174, 176, which is articulatably connected by means of the connecting rod 177 with the cam 129 which is fixedly arranged on the shaft 73, will be actuated in anti-clockwise direction (Figure 2) around the shaft 160. As in the set of keys in the thousands place there is a "5,"

in the ten thousands place a "2" and in the hundred thousands place a "2" and the corresponding contacts 184, 185 have not yet been closed by the insulating discs S2 and S5, the corresponding toothed segments 161 will, under the action of the springs 173, be rocked in the anti-clockwise direction round the shaft 160 until the discs So to S9 close the corresponding contacts 184, 185, the toothed segments 161 remaining until such time constantly in contact with the rubber roller 174a of the rod 174 of the frame 175, 174, 176. This includes the following operations.

When the insulator disc S2, which corresponds to the value "2," releases the contact springs 184, 185 so that the latter come into contact, the previously mentioned circuit is definitely closed. The magnet 163 of the ten thousands place now attracts the arm 164, whereby the tooth-shaped member 166 will mesh with the third tooth of the rack 168 and the gear segment 161 will be prevented from rocking further. The numeral wheel 121 of the ten thousands place now registers a "2." As in the hundred thousands place the key KHTh2, which also corresponds to the value "2" has been depressed, the same process will take place as in the ten thousands place, so that there is no need to repeat the description. After the numeral wheels 121 of the ten thousands and the hundred thousands places registered each a "2," the disc S5 corresponding to tne key KTh5 which corresponds to the value "5" in the thousands place releases the contact springs 184, 185 so that the latter come into contact and the previously mentioned circuit is definitely closed. At this moment, the magnet 163 in the thousands place attracts the arm 164, and this causes the latter to engage with its tooth-shaped member 166 with the sixth tooth of the rack 168, while the toothed segment 161 is prevented from rocking further. The toothed segment 161 has now rotated the numeral wheel 121 of the thousands place from "0" to "5." This means that the value "225000" which has been registered in the set of keys has been transferred to the numeral wheels 121 of the result register R. During the rocking of the toothed segments 161, the latter, under the influence of the springs 173, remain in contact with the rubber roller 174a of the rod 174 of the frame 175, 174, 176, until they are stopped by the teeth of the rack 168 in the manner which has been described hereabove. From this moment onwards, the springs 173 will extend, until the rod 174 of the oscillating frame 175, 174, 176 has reached its extreme pivoting position. In this position, the rollers 128, 128a will slide from the higher parts of the cams 129, 129a on to the lower parts of the cams 129, 129a and this will cause the register frame 117, 118 to rock in a clockwise direction round the shaft 115 and the toothed wheels 125, which are rigidly connected with the numeral wheels 121, to disengage from the teeth of the toothed segment 161, so that the toothed wheels 125 are not influenced by the toothed segments 161 when the latter execute a return movement and are available, if required, for a tens transfer of which I shall speak later. At the same time, the detents 135 will again engage with the toothed wheels 125.

During the second half of the rotation of the shaft 73, the frame 175, 174, 176 is rocked in the clockwise direction (Figure 2) round the shaft 73 by the cam 129, by means of the connecting rod 177. During this operation, the rod 174 will take along the separate toothed segments 161 successively so that they are again rocked back.

In the first instance, the disc S5 which corresponds to the value "5," will put the contact springs 184, 185 out of contact, so that the circuit is interrupted. In consequence of this, the corresponding magnet 163 will release the arm 164, so that the latter, under the action of a spring which is not shown in the drawing, will disengage again with its member 166 from the tooth of the rack 168.

During the further rotation of the shaft 73, the disc S2 which corresponds to the value "2" will interrupt the already mentioned circuit by interposing itself between the two contact springs 184, 185. This causes the magnet 163 of the ten thousands place, and the magnet 163 of the hundred thousands place, to release the arm 164, so that the tooth-shaped members 166 of the arms 164 disengage from the teeth of the rack 168. The toothed segments 161 of the ten thousands place and the hundred thousands place will now, in consequence of a further rotation of the shaft 73 and the effect of the cam 129, by means of the connecting rod 177 rock the rod 174 of the frame 175, 174, 176 round the shaft 160 in the clockwise direction (Figure 2).

Just before the rotation of the shaft 73 has been completed, the disc So which corresponds with the value "0" will interpose itself between the contact springs 184, 185 whereby the previously mentioned circuit is interrupted and the magnets 163 of the units place, the tens place and the hundreds place as well as the magnets 163 of all the places to the left of the hundred thousands place will release the corresponding arms 164, causing the tooth-shaped members 166 of the arms 164 to disengage from the teeth of the rack 168.

As the addition key 2 has been immediately released after it has been struck, the nose 72 of the lever 68 has come into contact with the locking disc 74 and slides on the latter. After the shaft 73 has made one revolution, the disc 74 is stopped by the nose 72 of the lever 68 and prevented from rotating any further. At the same time, the contact spring 71 is put out of contact with the contact member 75a so that the circuit is interrupted and the machine is stopped. All the mechanism have now returned to their rest position.

In order to make it possible to deduct the value "87000" from the value "225000," it is in the first place necessary to eliminate the value "225000" from the set of keys.

For the purpose of eliminating the figure "225000" which has been registered in the set of keys, the cancelling key 7 (Figures 1 and 4) is depressed. This key, by means of the pin 47 which is affixed to its key stem 45, will act upon the cam 49 which is fixedly arranged on the shaft 48, rocking this cam as well as the shaft 48 and all the other cams 50 against the pressure of the springs 24 in the anti-clockwise direction (Figure 2). During this operation, the cams 50 will act upon the flanges 51 of the key lock bars 23. The latter will now be displaced to the right (Figure 2) against the pressure of their springs 24, so that the pins 21 of the depressed keys K will disengage from the notches 24a of the bars 23 and the keys K will be able to return in an upward direction to their rest position under the action of their springs 19. After the cancelling key 7 has been released, the lock bars 23, under the influence of their springs 24, will return into their rest position shown in Figure 2, and in addition the cams 50 and 49 are rocked back together with their shaft 48 under the influence of their springs 24 into their rest position shown in Figure 2, which is determined by the pin 47 of the eliminating key stem 45 coming into contact from below against the cover plate 12.

Before discussing the operations which take place during subtraction, it may be mentioned in a few words, that the calculating mechanism of the present invention works only in one direction of rotation, i. e., in the case of negative calculations the subtrahend is not subtracted by a corresponding inverse rotation but the complement of the subtrahend is added.

Let the value "87000" be subtracted from the value "225000" which has been registered in the result register R, as in the above example. As on account of the previous example, the machine is still adjusted for addition, the registering of the value "87000" in the set of keys would, in the first place, cause a preparatory closing of other circuits which would be rectified when the subtraction key 3 is depressed, as will be described later on. As in the addition example, it has been already described how the circuits run when a figure is registered on the set of keys K in the following circuits such as are preliminarily closed when the value "87000" is registered in the set of keys K, will not be described, but only after the subtraction key has been depressed.

After the value "87000" has been registered in the set of keys K, the subtraction key 3 is depressed against the action of its spring 77. In this operation, the pin 78 which is riveted on to the key stem 76, acts upon the pin 86 of the shift cross 80, causing the latter to rotate in the anti-clockwise direction round the pin 82. During this rotating movement, the notch 80a of the shift cross 80 actuates the pin 84 which is arranged on an angle piece 85 fixed to the contact plate 17, so that the contact plate 17 is displaced in the direction of the arrow a (Figure 2).

During the displacement of the contact plate 17 (Figure 9), the nose 17x of the locking pawl 17a disengages from the stop 17f of the contact plate 17 and engages with the stop 17g of the contact plate 17, so that the latter is held in the displaced position indicated by the arrow.

When the subtraction key 3 (Figure 2) is depressed, the arm 80b of the shift cross 80, which protrudes from the upper plate 12 of the key board K, is rocked from the position marked "+" on the plate 12 of the keyboard K to the position marked "—," so that the operator can see at once what calculation the machine is making.

When the contact plate 17 is displaced, the contact spring CTh7 of the thousands place, which corresponds to the depressed key KTh7 is put out of contact with the contact pin StTh7 (shown in Figure 12 in heavy lines) and is put into contact with the contact pin StSTh7 (shown in Figure 12 in hollow circles) whereby, by way of the insulation disc S2, corresponding to the complementary value to seven, the circuit Z, Z2, L2, F, StSTh7, CTh7, ATh, B4, W4, Cd is closed. The contact spring CTTh8 of the ten thousands place of the corresponding key KTTh8 after the displacement of the contact plate 17, is put out of contact with the contact pin StTTh8 and into contact with the contact pin StSTTh8 and, by way of the insulator discs S1, corresponding to the complementary number to "eight" the circuit Z, Z1, L1, G, StSTTh8, CTTh8, ATTh, B5, W5, Cd is closed. The keys KTh7 and KTTh8 are held in the depressed position by the lock bars 23 (Figure 2) in the already described way.

In consequence of the depression of the keys KTh7 and KTTh8 in the thousands and ten thousands places, the indicator bars 25 have also been displaced by means of the pins 21, so that the figures corresponding to the depressed keys become visible through the inspection apertures 31 of the indicator device A.

Besides this, the depression of the keys KTh7 and KTTh8 causes the pins 21 which are riveted on to the key stems 19 (Figure 2) to act upon the inclined surfaces 44 of the corresponding bars 37 so that the latter are displaced in the direction of the arrow a (Figure 8) and against the action of their springs 41. During this operation, the contact springs 40, with their insulator members 39, spring into the notches 38 of the bars 37, so that the contact springs 40 with their contact pins StTho and StTTho (Figure 12) are put out of contact.

In the four left key rows in which no value is set, the contact springs 40 cause the circuits to remain closed by way of the common conductor Z, Z9, L9, H1, H and the separate conductors StSHTho, 40, AHTh, B6, W6, Cd; StSMo — 40AM — B7 — W7—Cd; StSTMo—40—ATM—B8—W8, Cd; StSHMo—40—AHM—B9—W9 and Cd.

The remaining four left totalizer places R10—R13 of the result register R, which are not connected with the nine vertical key rows, receive their current by way of the contact spring CLo, and the controlling operation of the insulator disc S9, corresponding to the complementary number to "zero" (Figure 12). The circuit in this instance runs from Z, Z9, L9, H1, H, CLo, LLo by way of SC1 through the separate conductors B10—B13, W10—W13 and Cd.

In the tens and hundreds places where no values are registered, the displacement of the contact plate 17, causes the contact springs 40 to be put out of contact with the contact pins StTo, StHo and into contact with the contact pins StSTo, StSHo, thus closing the circuits by way of the insulator disc S9 corresponding to the complementary number to zero over the common conductor Z, Z9, S9, L9, H1, H and over the separate conductors StSTo—40—AT—B2—W2—Cd and StSHo—40—Ah—B3—W3—Cd.

In the units place, on the contact plate 17 being displaced in the direction of the arrow a, the contact spring 40 is disengaged from the contact pin StUo and is not put into contact with any contact pin. The effect of this arrangement will be described in detail later on.

When the subtraction key 3 (Figure 2) is depressed against the action of its spring 77, it acts by means of its key stem 76 on to the lever 79a which is arranged on the rotatable shaft 57 and swings the shaft 57 against the action of its torsion spring 61 in the clockwise direction (Figure 3) and this will close the motor contact 75a (Figs. 2 and 7) by way of the members 62, 64, 28, 66, 68, 71, as has been already described. At the same time, the nose 72 of the lever 68 releases the nose 74a of the lock disk 74, so that the shaft 73 can rotate freely under the action of the motor M by way of the members 194, 193.

Immediately after the beginning of the rotation of the shaft 73, the totalizer frame 117, 118 is rotated in the already described manner round the shaft 115 in the anti-clockwise direction by way of the members 129, 129a, 128, 128a, 127, 127a, and in this operation, the gears 125 which are firmly connected with the numeral wheels 121 of the result register R engage with the toothed segments 161. During the rotation of the frame 117, 118, the detents 135 also release the toothed wheels 125 in order to avoid any unnecessary noise. The numeral wheels 121 of the result register R which are connected with the toothed wheels 125, can in no instance execute an undesired rotation when released by the detents 135, whereby wrong values would be registered in the result register, because the toothed wheels 125 are, at the same time, in mesh with the toothed segments 161.

After further rotation, of the shaft 73, the insulator disc S1, which corresponds to the value 8, releases the contact springs 184, 185 (Figure 3), so that now the above mentioned circuit is completely closed. The magnet 163 of the ten thousands place thereupon attracts the arm 164, the toothed segment 161 being stopped by the fact that the tooth-shaped member 166 engages with the second tooth of the rack 168. The rotation of the toothed segment 161 has caused the numeral wheel 121 of the ten thousands place to rotate by one unit, so that in the inspection aperture of the result register R a "3" is showing.

After further rotation of the shaft 73, the insulator disc S2, which corresponds to the value 7 in the ten thousands place, releases the contact springs 184, 185 (Figure 3), so that they come into contact and thus completely close the above mentioned circuit. The magnet 163 (Figure 5) of the thousands place of the result totalizer R, now attracts the arm 164 and this causes the tooth-shaped member 166 to engage with the third tooth of the rack 163, so that the toothed segment 161 is prevented from rotating any further. In this operation, the numeral wheel 121 of the thousands place has been rotated from 5 to 7. In the inspection aperture of the result register R, therefore, a "7" will appear.

Just before the shaft 73 has completed half a revolution, the insulator disc S9, which corresponds to the values "0" releases the contact springs 184, 185 and this closes the circuits which have been described above completely, this being the circuits for the second, third and sixth to thirteenth position of the result register R. At the same time as the circuit is closed by the springs 184, 185, the magnets 163 become energised and cause the arms 164 with their tooth-shaped members 166 to engage with the tenth tooth of the rack 168. The rotating of these toothed segments 161 causes the numeral wheels 121 to move from "0" to "9", so that in the inspection apertures of the result register R "nines" will appear.

In the result register R, therefore, the following figure has been added:

9999999912999 which is the complement of the subtrahend

0000000087000

As in the units place no contact was preliminarily closed when the contact plate was displaced, the contact springs 184, 185 also did not close any contact, so that the toothed segment 161 of the units position can, under the influence of the spring 173, participate in the further swinging movement of the frame 175, 174, 176, remaining constantly in touch with the rod 174 of the frame 175, 174, 176. As the segment 161 of the units place could swing still further and the toothed wheel 125 is in mesh with the toothed segment 161, the numeral wheel 121 of the units place, which is rigidly connected with the toothed wheel 125, has been rotated by a further unit, therefore from "9" to "0." During the rotation of the numeral wheel 121 of the units place from "9" to "0," the pin 139 which is arranged on the numeral wheel 121 has rotated the sixteen-toothed gear 141 which is loosely rotatably arranged on the shaft 140 which is rigidly arranged on the two side parts 117, 118 of the register frame, by one tooth round the shaft 140 in the anti-clockwise direction (Figure 5). In this rotation have also participated the wheel 142 which is firmly connected with the toothed wheel 141 and the wheel 144 the tooth 142a of the wheel 142 moving into the path of the tens transfer disc 143, so that the transfer of the tens is prepared. The detent 146 holds the toothed wheel 141, the star wheel 142 and the star wheel 144 in the new position.

When the rocking frame 175, 174, 176 has reached its extreme position which is determined by the curve discs 129, 129a the register frame 117, 118 is swung into the rest position shown in Figures 2 and 5 by means of the cams 129, 129a and by way of the rollers 128, 128a. In this operation, the toothed wheels 121 of the result register R are disengaged from the toothed segments 161.

The toothed segments 161 are then rotated back into their normal position shown in Figure 2, by the frame 175, 174, 176 in the already described manner. Just before the shaft has completed one full revolution, the insulator disc So which corresponds to the figure 0 has separated the last contact springs 184, 185 so that all the circuits are interrupted.

During the first half of the revolution of the shaft 73, the disc 191 (Fig. 6), which is firmly arranged on the pin wheel 187, glides with its face 191a past the face 192 of the Maltese cross 189, so that the latter is prevented from rotating. After half a revolution, the pins 188 of the pin wheel 187 act upon the Maltese cross 189, in that the teeth 189a of the latter mesh and rotate it in the direction of the arrow b shown in Figure 6. As the shaft 115 is firmly connected with this wheel, the shaft 115 will also participate in this revolution. During this operation, the cam 143 of the units position, which is firmly arranged on the shaft 115, acts upon the tooth 142a of the four-toothed wheel 142 and rotates it round the shaft 140 in the anti-clockwise direction (Figures 2, 5), by three tooth sections. The four-toothed wheel 144 which is firmly connected with the wheel 142 is, therefore, also rotated in the anticlockwise direction. The wheel 144 which acts together with the toothed wheel 125 which is arranged on the numeral wheel 121 of the second calculating position of the result register R rotates, by way of the toothed wheel 125, the numeral wheel 121 of the second denominational order by one unit from "9" to "0" and this concludes the tens transfer in this position. The tens transfer to the next higher denominational order takes place in the same way and is, therefore, not described again. In the inspection apertures of the result register R can now be seen the result of the subtraction

225000—87000=138000

Now the value 87000 which is registered on the set of keys is eliminated by means of the cancelling key 7 in the already described manner, whereupon all the mechanism have returned to their rest position and the next value 723 can be registered on the set of keys K.

According to the example of calculation which has been set above the value 723 is now to be deducted from the result 138000 which appears in the result register R. To this end the value 723 must be registered in the set of keys K. In this operation, the machine being adjusted to subtraction on account of the previous calculating operation, as indicated by the indicator lever 80b, which points to "—," the following circuits are preliminarily closed.

In the units place the depression of the key KU3 (Figure 1) which corresponds to the value 3, against the pressure of the spring 20 (Figure 2), the contact spring CU3 has been put into contact with the contact pin StSU3 (Figure 12), whereby, by way of the insulator disc, the circuit Z, Z7, S7, L7, Q, Q1, Q2, Q3, StSU3, CU3, AU, B1, W1, Cd is preliminarily closed. In the tens place the depression of the key KT2 (Figure 1) which corresponds to the value 2, has put into the contact the contact spring CT2 with the contact pin StST2 (Figure 12), whereby, by way of the insulator disc S7, corresponding to the complementary number to "two" the circuit Z, Z7, L7, Q, Q1, Q2, StST2, CT2, AT, B2, W2, Cd (Figure 12) is closed. In the same way in the hundreds place the depression of the key TH7 which corresponds to the value 7, has put into contact the contact spring KH7 with the contact pin StSH7, whereby the circuit Z, Z2, L2, F, StSH7, CH7, AH, B3, W3, Cd are preliminarily closed.

In the six left hand rows of keys, in which no value is set, the contact springs 40 remain in contact with the contact pins STSTo to StSHMo, the circuits (in the following only one circuit will be described because all the others are closed in the same way), Z, Z9, L9, H1, H, StSTho, CTho, ATh, B4, W4, Cd (Figure 12) are preliminarily closed.

In the case of the remaining four left calculating positions R10—R13 of the result register R, which are not connected with the nine vertical key rows, the circuits, by way of the insulator disc S9 corresponding to the complementary number to zero and by way of the contact spring CLo, are preliminarily closed by way of the common conductor Z, Z9, L9, H1, H, CLo, LLo, by way of SC1 as well as the separate conductors B10—B13, W10—W13 and Cd.

When the subtraction key 3 (Figure 2) is depressed, the contact 75a is closed by way of the members 76, 79, 57, 62, 64, 28, 65, 68, and 71. At the same time the nose 72 of the locking lever 68 releases the nose 74a of the locking disc 74 so that now the shaft 73 can be rotated in the direction of the arrow.

Shortly after the beginning of the rotation of the shaft 73 the register frame 117, 118 (Figures 2 and 5) is rotated by way of the members 129, 129a, 128, 128a, 127, 127a in the already described manner round the shaft 115 in the anti-clockwise direction and during this operation the toothed wheels 125 mesh with the toothed segments 161. During the rotation of the frame 117, 118 the detents 135 also release the toothed wheels 125.

During the further rotation of the shaft 73, the insulator disc S2, which corresponds to the value 7 in the hundreds place, releases the contact springs 184, 185 (Figure 3) so that the circuit is now entirely closed. Now the magnet 163 of the hundreds position of (Figures 2 and 5) of the result register R, attracts the arm 164, so that the tooth-shaped member of the arm 166 engages with the third tooth of the rack 168 and thus holds the toothed segment 161 in position. The numeral wheel 121 of the hundreds place, therefore, shows a "2."

The further rotation of the shaft 73 will cause the insulator disc S7 which corresponds to figure 2 in the tens position, to release the contact springs 184, 185 so that the already described circuit is definitely closed, whereupon the magnet 163 of the tens position of the result register R will attract the arm 164. During this operation the tooth-shaped member 166 will engage with the eighth tooth of the rack 168. The toothed segment 161 of the tens place can, therefore, not rotate any further and this will also prevent the figure roller 121 from rotating and a "7" will appear in the inspection aperture of the tens place.

As in the units place a key has been depressed which corresponds to the value 3, the result would be, as the complementary number of 3 is 6, only a "6" would be added to the units and this would naturally give a wrong result. Therefore in the case of negative calculation always a "1" must be added in the units place, and this is obtained by switching over according to the circuit diagram illustrated in Figure 12. As the current, as already stated, goes by way of the contact spring CU3, the contact pin StSU3, the circuit Q3, Q2, Q1, Q, L7, Z7, Z etc., the insulator disc S7 will close, at the same time as the circuit closed in the tens place, the circuit in the units place, and therefore, the magnet 163 of the units place will attract the arm 164 and will cause its tooth-shaped member 166 to engage with the eighth tooth of the rack 168, whereby the rotation of the segment 161 of the units place and the rotation of the corresponding numeral wheel 121 are completed. The numeral wheel 121, therefore, shows a "7."

Before the completion of half a revolution of the shaft 73, the insulator disc S9 which corresponds to the value "0" of the remaining six rows of keys and the four left positions of the result register R10—R13, releases the contact springs 184, 185, whereby the above described circuits are completely closed. The closing of the circuits by the springs 184, 185 causes the magnets 163 to attract the arms 164 so that the latter will engage with their tooth-shaped members 166 with the tenth tooth of the rack. The swinging of these toothed segments 161 caused the respective numeral wheels to rotate through nine units.

The register showed _____ 0000000138000
The complement of the subtrahend 723 was added _____ +9999999999277
Therefore, without considering the tens transfer movement, the register would show _____ 9999999027277

As however, during this adding movement, the numeral wheel 121 in the thousands place moved from "9" to "0" the pin 139 of the numeral wheel 121 acted upon the sixteen-tooth wheel 141 and rotated it by one tooth sector in an anti-clockwise direction (Figures 2 and 5), thus preparing a tens transfer.

When the frame 175, 174, 176 has reached its extreme outswung position determined by the cams 129, 129a, the register frame 117, 118 is in the first place rotated into its normal position shown in Figure 2 by means of the cams 129, 129a by way of the rollers 128, 128a in this position, the toothed wheels 125 are disengaged from the toothed segments 161. Further rotation of the cams 129, 129a will cause the frame 175, 174, 176 to rotate into its rest position shown in Figure 2, the rod 174 of the frame 175, 174, 176 taking along the toothed segments 161 successively and rotating them back on their shaft 160 into their normal position (Figure 2).

During the second half of the revolution of the shaft 73 (Figures 2 and 6) the tens transfer is completed in all the places to the left of the thousands place in the already described way, by way of the members 187, 189, 115, 143, 141, 142, 144, 125, and this causes all the mechanisms which have been actuated by the depression of the subtraction key 3 to return to their normal position. In the result register R, the final result "137277" is visible. The value "723" which is still registered in the set of keys is then eliminated by means of the cancelling key 7.

In the following will be described the elimination of the figure "137277" which is registered in the result register R. To this end it is first necessary to depress the resetting key 4. This key is held in its depressed position by the fact that the pawl 92 which is actuated by a torsion spring 93 round the screw 91 in the clockwise direction (in the direction of the arrow e as shown in Figure 10), falls into the notch 95 of the key stem 88. During this operation the key stem 88 of the resetting key 4 acts upon a lever 97 which is arranged on a bar 98 which can swing round the shaft 57 and upon the pin 100 of the lever 99 which is riveted on to the shaft 57. When the resetting key 4 is depressed the lever 97 is caused to rotate on the shaft 57 in the clockwise direction (Figure 3). In this swinging movement participates also a lever 101 which is fixedly arranged on the bar 98, the lever being provided with a cord 102 running over the rollers 103, 105, 106, 110, which interrupts a contact 111 (Figures 10 to 12), so that the current supply to the insulator discs S0—S9 becomes impossible, so that when the insulator discs S0—S9 release the contact springs 184, 185, no circuit is closed.

On the lever 101 is also arranged another cord 113 which, at a suitable place, is interrupted by a spring 122 and runs over the rollers 103, 105, 114, this cord is moved when the lever 101 rotates in a clockwise direction, in the direction of the arrow c. The cord 113, which, at its other free end, is attached to a pin 116a which is arranged on the lever 116, rotates the lever 116 as well as the shaft 119 on which the lever 116 is fixedly arranged, and which rotates in the two side walls 117, 118 of the register frame, in the anti-clockwise direction (Figure 10). The shaft 119, as shown in Figure 10, is flattened longitudinally on one side and during its revolution can act upon the pins 151, 152, which are arranged in the numeral wheels 121.

When the resetting key 4 is depressed, then, as already described, it will act upon the lever 97, which, in its turn, acts upon the pin 100 which is fixed to the lever 99 and, therefore, rotates the shaft 57 against the action of its torsion spring 61 in the clockwise direction, and this closes the motor contact 75a by way of the members 62, 64, 28, 65, 68, 71 as already described. At the same time as the contact 75a is closed, the nose 72 of the locking lever 68 releases the nose 74a of the locking disk 74. The shaft 73 then begins to revolve.

Immediately after the shaft 73 begins to revolve, the frame 117, 118 is rotated against the action of the springs 131 on the shaft 115 in the anti-clockwise direction (Figure 2) by the cams 129, 129a which act upon the rollers 128, 128a which are arranged on the arms 127, 127a of the frame 117, 118, the toothed wheels 125 of which engaging with the toothed segments 161.

At this moment the frame 175, 174, 176 is rotated by means of the cam 129, round the shaft 160 in the anti-clockwise direction. The toothed segments 161 also participate in this rotation movement under the influence of their springs 173. During this rotation of the toothed segments 161, the numeral wheels 121 are rotated and the toothed segments 161 swung, until the numeral wheels 121, the pins 151, 152 of which come to rest from underneath against the swung flattened shaft 119, are prevented from executing any further rotation movement. The pin 151 of the numeral wheel 121 corresponding to the units place, is so arranged that, when the numeral wheel 121 stands at zero, the pin is just stopped by the flattened locking shaft 119, while the pins 152 of the other numeral wheels 121 are so arranged that, when the numeral wheels 121 stand at "9," i. e., when "9" are visible in the inspection apertures of the result register R, the pins 152 are stopped by the locking shaft 119.

As in the result register R the figure 137277 is visible, the numeral wheel 121 of the units place is rotated by three units, i. e., from "7" to "0" and at the moment in which the numeral wheel 121 stands at zero, the pin 151 is stopped by the locking shaft 119, so that the numeral wheel 121 is prevented from further rotation and the corresponding gear segment 161 is prevented from swinging further. During the movement of the numeral wheel 121 from "9" to "0" a tens transfer has been prepared by means of the pin 139 arranged on the numeral wheel 121, in the above described manner. As the numeral wheels 121 show a 7 in the tens and thousands places, the numeral wheels 121 are stopped by the locking shaft 119 at the moment when the numeral wheels 121 stand at "9." Thereupon follows the stopping of the numeral wheel 121 of the ten thousands place, the hundreds place and finally the hundred thousands place in the same way which has been already described. The numeral wheels 121 of the result register R corresponding to the remaining left calculating positions in which the numeral wheels 121 stand at zero, are now also rotated by the toothed segments 161 until they are stopped by the locked shaft 119, and this happens when in the corresponding inspection apertures of the result register R, "nines" appear in these calculating positions.

If now, for example, the units numeral wheel 121 of the units place stands at "0" and the resetting key 4 is actuated, then the numeral wheel 121 moves from "0" to "9," this being possible because the stop 172, which is arranged at the rack of the units place, has moved to the right by one tooth section of the toothed wheel 125 on the rack 168, so that the toothed segment 161 can rotate the numeral wheel 121 by one unit more.

After such a rotation of the shaft 73, the frame 117, 118 is again rotated back into its rest position shown in Figure 10, as already described, the toothed wheels 125 disengaging from the toothed segments 161. During this operation, and at the same time, all the toothed segments 161 which have been rotated more or less according to the value which the numeral wheel 121 in question was showing before the resetting key was depressed, will be rotated in the anti-clockwise direction round the shaft 160 under the influence of their springs 173, their final position being determined by being stopped by the rubber roller 174a of the rod 174 of the frame 175, 174, 176.

At this juncture the frame 175, 174, 176 and the toothed segments 161 are rotated back into the normal position shown in Figure 2, by means of the cam 129.

During the second half of the revolution of the shaft 73, that is after the frame 117, 118 has been rotated back into its rest position, the cam 132 (Fig. 10) which is fixedly arranged on the shaft 115 and is actuated by way of the members 194 (Fig. 7) 193, 73, 187 (Fig. 6), 189, 115, will act upon the pin 133 of the lever 116, rotating the lever 116 and the locking shaft 119 in the clockwise direction (Figure 10), the locking shaft 119 moving out of the path of the pins 151 and 152 which are arranged on the numeral wheels 121, so that, during the tens transfer which is described later on, the numeral wheels 121 can pass by the locking shaft 119 without hindrance.

The rocking of the lever 116 by means of the cam 132 would be impossible while the resetting key 4 is held in a depressed position and trouble would be caused thereby if the spring 122 were not inserted in the cord 113 and were not to give way when the lever 116 is swinging.

Now, on the shaft 73 being rotated further, that is, during the return movement of the toothed segments 161 in the above described way, the tens transfer takes place, causing all the other numeral wheels to be rotated to "0," there being no need to describe this in detail here.

Immediately after the completion of the revolution of the shaft 73, the lever 68 (Fig. 7) under the action of the spring 68a, drops into the notch 74a of the locking disc 74 and this causes the lever 68 to rotate on the screw 69 in the anti-clockwise direction (when seen in Fig. 2). In consequence of this the lever 65, the shaft 28 and the lever 64 are rotated in the clockwise direction. During this operation, the lever 64 will act on the inclined surface 92a of the pawl 92 and rotate it against the pressure of its torsion spring 93 in the anti-clockwise direction (when seen in Figure 10 in the direction of the arrow e). In consequence of this the pawl 92 will disengage with its part 94 from the stop 95 of the key stem 88 of the resetting key 4, so that the latter returns into its normal position under the influence of its spring 89. At the same time the contact 111 is again closed because during the upwards movement of the resetting key 4, the lever 97 and the lever 99 could swing in the anticlockwise direction (Figure 3) under the influence of the torsion spring 61.

The latter can, however, not close any circuit, because the insulator discs S0—S9 have already separated the contact springs 184, 185. All the mechanisms have now returned to their normal position.

The result register R can also be put into the zero position in the following way. For this purpose it is in the first place necessary to move the tens transfer mechanism outside the action of the numeral wheels 121 of the result register R. This is ensured by the fact that, on the resetting key 4 being depressed, a member 153 (Fig. 11) which is arranged on the key stem 88, acts with its inclined face, which is not shown in the drawing, upon the downward directed arm of the two-armed lever 154. This causes the latter to swing on the screw 155 against the action of a spring 154a and during this operation the pin 157, which is arranged at the other free end of the two-armed lever 154, and engages in a circular groove (not shown in the drawings) of a bush 159 which is firmly arranged on the shaft 140 by means of the screw 158, displaces the shaft in the direction of the arrow P (Figure 3). The different tens transfer mechanism which are situated between two sleeves 145 which are fixedly arranged on the shaft 140 also participate in this movement. During this operation, the sixteen tooth toothed wheels 141 disengage from the pins 139 of the numeral wheels 121, so that no tens transfers can be prepared by a latter revolution of the numeral wheels 121. In order that the tens transfer wheels 141, 142, 144 cannot revolve in the left displaced position, the toothed wheels 141 are designed wider so that the detents 146 remain in mesh with the toothed wheels 141.

As has been described above when speaking of the depressing of the resetting key in the first example, the contact 111 is interrupted at the same time by way of the members 97, 101, 102, 103, 105, 106, 110 and the lever 116 as well as the shaft 119 are swung in an anti-clockwise direction by way of the members 101, 113, 103, 105, 114, 116a, the flattened shaft 119 being thereby moved into the path of the pins 152a which are arranged on the numeral wheels 121. In this case the pins 152a are so arranged on the numeral wheels 121 that, when the numeral wheels 121 stand at zero, the pins 152a come to lie against the locking shaft 119. As in the present design, the numeral wheels 121 of the denominational order which already stood at zero, i. e., in which no figure was registered, must revolve from "zero" to "zero," it becomes necessary that the toothed segments 161 should be swung further for a distance corresponding to the toothed part of the toothed wheels 125. For this purpose a stop 172 (Figure 5) is arranged in the rack 168 and placed by this distance towards the right, so that all the toothed segments 161 can swing through ten units. Once all the numeral wheels 121 have been put at zero in this way, all the other operations described in the first example will follow each other successively and need not be described in detail here. In the case of this design, the disc 132 can be omitted, because in this case it is not necessary to swing the locking shaft 119 after the half revolution of the shaft 115, in order to complete the tens transfer, because in the present case all the numeral wheels 121 are immediately rotated to zero.

Let the operations which take place in the case of multiplication be described with the help of the example "336×425=142800."

In the indicator series D of the revolution counter U a white point is visible in the inspection aperture on the extreme right and in the right inspection aperture of the indicator series G of the result register R which shows to the operator of the machine that it is calculating with the units place of the set of keys into the units place of the result register R+. The way in which these mechanisms work will be described in detail at a later stage.

In the first place, the figure "336" is registered in the set of keys T and this is done in the three rows of keys on the right. When this is done, the previously described operations take place and the corresponding circuits are preliminarily closed. The latter are not described in detail either, because they can easily be followed on the circuit diagram and the previously described examples.

At this juncture, the addition key 2 is depressed and kept in a depressed position until, in the revolution counter U, a "5" appears in the units place, the result register showing in this case the figure "1680+." As on the addition key 2 being depressed also previously described operations take place, they need not be described here again. It may be mentioned, however, that from the units place into the tens place three ten transfers and from the tens place into the hundreds one ten transfer have taken place.

In the following is described the working of the mechanism of the revolution counter U.

After the addition key 2 (Figure 2) has been depressed, the shaft 73 is actuated in the anti-clockwise direction (Figure 2) and a toothed wheel 280 which is firmly affixed on the right side of the shaft 73 participates in this rotation. The toothed wheel 280 which is in mesh with the toothed wheel 281 which is firmly arranged on the shaft 260a, therefore, will rotate the latter as well as the shaft 260a in the clockwise direction (Figure 2).

As, in consequence of the depressing of the addition key 2, the shaft 73 makes five revolutions, the shaft 260a will naturally also execute five revolutions. A one tooth cam 267, which is also slidably arranged on the shaft 260a but in such a way that it rotates with the shaft 260a, also participates in these revolutions. This cam 267 after each revolution actuates with its tooth 268 the right toothed wheel 269 of the revolution counter U, which wheel 269 is arranged on the shaft 271 so that it can rotate freely by five units and the numeral wheel 270 of the units place of the revolution counter U, which is fixedly connected with the toothed wheel 269, also participates in this rotation, displacing it from "0" to "5." As soon as the numeral 3 wheel 270 of the totalizer U registers a "5," the operator must release the addition key.

As the result register R is not slidable, the connecting conductor of each vertical row of keys to the different magnets 163 must be displaced. This is done by a distributor V (Figure 12). In the present example, the units place of the set of keys K must now enter values into the tens place of the result register R. For this purpose the key 5 must be depressed against the action of its spring 196 (Figure 2). During this operation the pin 197a which is riveted on to the part 195a of the key stem 195 (which part is bent over at a right angle) acts upon the bevel 198 of the slide 199 displacing the latter against the action of the spring 206 in a direction opposite to that of the arrow a, the stop pin 210 being pressed against the action of the spring in a downward direction and releasing the slide 199. During the sliding of the slide 199 to the left (Figure 2) in which movement the pawl 217, which is articulatably connected to the slide 199, also participates, the pin 218, arranged on the left side wall of the machine, acts on the upper inclined edge of the slot 219 of the pawl 217, so that the latter is swung on the screw 216 in the anti-clockwise direction (Figure 2). During this operation, its tooth 220 engages with one of the teeth of the switch wheel 237 and this causes the latter to swing round the shaft 232 by one tooth in the anti-clockwise direction (Figure 2). In this position the switch wheel 237 is held by a suitably arranged stop pawl 237a. The rotation of the distributor V is limited on the one hand by the pin 250a which is arranged on the drum 250 striking against the pin 250b which is arranged on the machine frame and on the other by the pins 215a, 242a striking against the upper edge of the slots 241, 242 of the rack 240. The toothed sector 238, which is fixedly arranged on the shaft 232, is therefore, also rocked in the anti-clockwise direction. During this operation the rack 240, which is in mesh with the toothed sector 238, is actuated in the direction of the arrow f and the toothed sector 244, which is in mesh in its turn with the rack 240, is swung in the direction of the arrow shown in Figure 2. As the indicator drum 246 is fixedly connected with the toothed sector 244, it is rotated in the same direction. In this way the row of figures marked in Figure 3 by $x$ becomes visible in the inspection apertures of the indicator series G for the result register R. During this operation there appears in the inspection aperture of the units place of the result register R a white spot which indicates that the first row of keys is entering values into the second position of the result register R. As can be seen from Figure 3, the figures from 1 to 9 are transposed by one place according to the nine perpendicular rows of keys and, in fact, repeated eight times, so that a displacement becomes possible on eight different figure positions.

When the switch wheel 237 (Figure 2) is rotated by one tooth, the curve drum 250 (Figure 3) which is also fixedly arranged on the shaft 232, is also rotated in the anti-clockwise direction (Figure 2). This causes the incline 249 of the curve drum 250 to act upon a roller 251 which is arranged on a slide 252 (the shape of which can be seen in Figure 3), and this causes the lever 256 to swing on the screw 257 in the anti-clockwise direction and against the pressure of the spring 256a (Figure 3). As now the pin 258 of the two-armed lever 256 engages in the circular groove 259 of a sleeve 260, the latter, the angle piece 261 which is firmly connected with the sleeve 260 and the indicator 263 which is arranged on the angle piece 261, are slid on the shaft 260a to the left in the direction of the arrow P. During this operation the white disc 264 which is arranged on the indicator 263, has become visible in the inspection aperture 265 which is in the tens place of the indicator series D and shows the operator that the machine is entering values set in the units row of keys into the tens row of the result register R. In the other inspection apertures 265 of the indicator series D of the revolution counter R, black discs appear.

As the cam 267 is also fixedly arranged on the sleeve 260 with the circular groove, it also participates in the displacement of the sleeve 260, the tooth 268 of the cam disc 267 being able to co-operate with the teeth of the toothed wheel 269 which is fixedly connected with the numeral wheel 270 of the tens place of the revolution counter U, at a later revolution.

Figure 13:
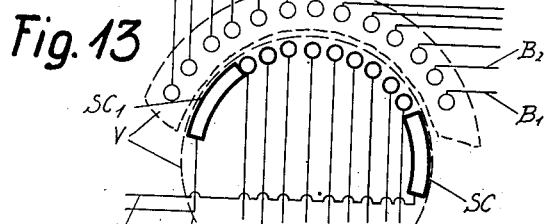
Figures 13 and 14 show partial elevations of the connections diagram with different connections.

As, on the shaft 232 being rotated as a result of the depressing of the key 5, the distributor part 233, fixedly mounted on the shaft 232 has also been swung in the anti-clockwise direction, the connections shown in the current diagram (Figure 13) have been established. As a result, during the following calculation operation, the units key row enters values into the tens place of the result register, the tens key place of the row of keys enters values into the hundreds place of the result register, and so on and on. With regard to the units place of the register, it can be seen in the circuit diagram (Figure 12), and on account of the fact that the circuit for the magnet 163 has not been closed preliminarily, the toothed segment 161, after the addition key 2 (Figure 2) has been depressed, would, under the action of its spring 173, participate in the swinging movement of the frame 175, 174, 176, and in the extreme right position of the result register R (into which no calculation must be made in this case) a tens transfer would be effected from this numeral wheel 121 to the next following numeral wheel 121, and this would of course give a wrong result. But, after the pressing down of the addition key 2 and the release of the contact springs 184, 185 by the insulator disc So, the circuit Z, Zo, Lo, Y, N (Fig. 9) Nl, Yl, SC, Bl, Wl, Cd (Figures 12 and 13) is closed. The magnet 163 of the units position will, therefore, immediately attract the arm 164, the latter coming immediately into mesh with the first tooth of the rack 168, so that the toothed segment 161 cannot rock and the numeral wheel 121 remains stationary at "0."

The addition key 2 is held depressed, until, in the second position from the right a "2" appears in the revolution counter U. On the addition key 2 being depressed, the already described operations have taken place, so that there is no need to describe them further here. Two tens transfers have taken place from the tens place into the hundreds place and from the hundreds place into the thousands place one tens transfer. In the result register R the figure "8400" has now appeared.

At this juncture, by depressing the key 5, a further column displacement to the left is effected and in this the same operations take place as they have been already described. During this operation the indicator device D of the revolution counter U has moved one place to the left by way of the members 195a, 197a, 198, 199, 217, 237, 232 and, therefore, in the inspection aperture of the hundreds place the white disc will appear, the cam 268 with the toothed wheel 269 of the tens place of the revolution totalizer device U having moved into a working position outside of and together with the hundreds place. Furthermore by way of the members 199, 217, 237, 238, 240, 244, the indicator drum 246 for the indicator device G of the result register R, with the row of figures marked x, has disappeared from the inspection apertures of the indicator series G while the row of figures marked Xl has become visible in the inspection apertures of the indicator series G.

In the inspection aperture of the units and the tens places, white discs have appeared and this shows the operator that the units row of keys is entering values into the hundreds place of the result register R.

Figure 14:
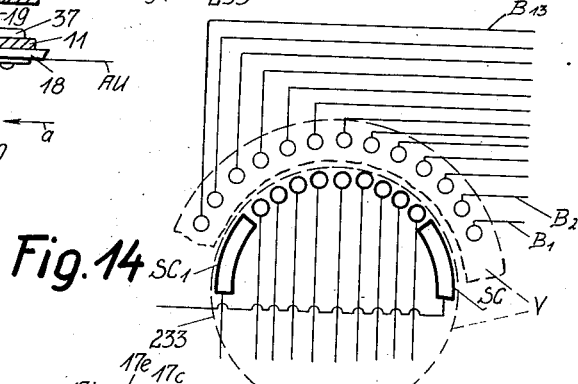

At the same time, the depressing of the key 5 causes, by way of the members 195a, 197a, 199, 217, 237, 232, the rotatable part 233 of the distributor V with its contact springs 234 to swing into the position shown in Figure 14, changing the circuits which can easily be followed on the connections diagram and according to the previously described circuit, so that there is no need to describe them in detail here.

The operation of the column displacement above described may also be effected by rotation of the parts 232, 233, 234, 250, by hand by means of the knob 8.

At this juncture the addition key 2 is depressed and held in a depressed position during four revolutions. When in the indicator series D of the revolution counter U a "4" appears in the hundreds place, the addition key 2 is released again. During this operation two tens transfers have taken place from the hundreds place into the thousands place, two transfers from the thousands place into the ten thousands place and one tens transfer from the ten thousands place into the hundred thousands place. In the result register the correct result "142800" being the product of 336×425, is now visible.

Following this, the value registered in the set of keys K is reset by depressing the cancelling key 7 (Figure 1). By twice depressing the key 6, the units place of the result register R is again moved into working position with the units key position by way of the members 203, 204, 199, 226, 237, 238, 240, 244, 246. This can also be done in one operation by turning the knob 8. The resetting of the revolution counter U is in this case effected by the butterfly nut 9 described in the U. S. A. Patent 1,061,137 (the nut being marked 11 in the said U. S. A. Patent). As the working of this resetting device is described in detail in the above mentioned patent, there is no need to describe it in detail here. At this juncture all the mechanisms have returned to their rest position and the machine is ready for a new calculation.

Finally, it will be described here by means of an example, that by means of the above described decimal transposition, the key field can be extended. Let us assume that in the result register, for example, the value 346588 has been registered and that a twelve digit value "132124336000" is to be added to this. As the set of keys has only nine positions, such an addition would be impossible. But as the three last digits of the value which is to be added "132124336000" are zeros, it becomes possible by means of the above described decimal transposition to register the "6," i. e. the thousands digit of the figure "132124336000" in the units position of the set of keys. This "6" however will register in consequence of the decimal transposition into the thousands digit of the result register R. In this way the twelve digit value "132124336000" which is to be added has been registered correctly.

Let it be assumed further that from a figure "334876" which is registered in the result register R the value 32000 is to be subtracted. In this case the three zeros of the figure 32000 can be disregarded and the "32" can be keyed into the units and tens position of the set of keys K, while, by means of the key 5 or the knob 8, it can be ensured that the units position of the set of keys K calculates into the thousands place of the result register R.

During the decimal transposition by means of the knob 8 or the key 5, the contact SC of the rotatable part of the distributor V has come into contact with the three right contacts of the fixed part of the distributor, and as furthermore, during the displacing of the contact plate 17, the contact stud N has remained in contact with the contact spring Nl, the following circuit is closed over the common conductor Z, Zo, Lo, Y, N, Nl, Yl, SC (Figures 9 and 12) and the separate conductors Bl, Wl, Cd, B2, W2, Cd and B3, W3, Cd. Therefore the magnets 163 (Figure 2) of the units, tens and hundreds place of the result register R will immediately attract the arms 164, and the tooth-shaped parts 166 will engage with the first teeth of the racks 168. The segments 161, therefore, do not influence the numeral wheel 121 of the result register R. The rest of the subtraction proceeds as indicated above.

I claim:

1. In a calculating machine, a keyboard including value key rows, a driving shaft, a motor cooperating with said driving shaft, key controlled contacts, controlling discs corresponding to the values "0" to "9," contacts controlled by said discs, a slidable switch board having a plurality of pairs of rows of contacts extending transversely of said keyboard, each row of keys of equal value being associated with a pair of transverse rows of said contacts, one row of each pair of rows being connected with one of said disc controlled contacts corresponding to the value of the key depressed and the other row of each pair of rows being connected with that disc controlled contact representing the complement of the value of the key depressed, ordinal differential members having electro-magnetic controlling means connected to said disc controlled contacts, counting wheels coacting with said differential members for computation in the positive or negative sense respectively according to whether the contact rows of the value of the keys or of the complement thereof are in position, an addition key, a subtraction key, a universal member connected to said switch board and rockable by said addition key and said subtraction key to determine the position of said switch board, a control shaft, members on said control shaft, one of said members being adapted to coact with said addition key and the other member being adapted to coact with said subtraction key, said driving shaft supporting said controlling discs and effecting the closure at differential times of said disc controlled contacts on rotation of said driving and controlling shaft, locking means on said driving shaft, connecting means between said members and said locking means, a motor contact, a member for controlling said locking means and said motor contact and adapted to be operated by said control shaft for releasing said locking means and closing said motor contact to render said motor operative.

2. In a calculating machine, a keyboard including value key rows, key controlled contacts, controlling discs corresponding to the values "0" to "9", contacts controlled by said discs, a slidable switch board having a plurality of pairs of rows of contacts extending transversely of said keyboard, each row of keys of equal value being associated with a pair of transverse rows of said contacts, one row of each pair of rows being connected with one of said disc controlled contacts corresponding to the value of the key depressed and the other row of each pair of rows being connected with that disc controlled contact representing the complement of the value of the key depressed, ordinal differential members having electromagnetic controlling means connected to said disc controlled contacts, counting wheels coacting with said differential members for computation in the positive or negative sense respectively according to whether the contact rows of the value of the keys or of the complement thereof are in position, an addition key, a subtraction key, a motor, a motor contact, a driving member supporting said control discs and being driven by said motor to effect closure at differential times of said disc controlled contacts, locking means on said driving member, controlling means common to said motor contact and said locking means, two universal members for said addition and subtraction keys, one of said universal members operating to shift said switch board and the other universal member operating said controlling means.

3. In a calculating machine, a keyboard including value key rows, key controlled contacts, controlling discs corresponding to the values "0" to "9," contacts controlled by said discs, a slidable switch board having a plurality of pairs of rows of contacts extending transversely of said keyboard, each row of keys of equal value being associated with a pair of transverse rows of said contacts, one row of each pair of rows being connected with one of said disc controlled contacts corresponding to the value of the key depressed and the other row of each pair of rows being connected with that disc controlled contact representing the complement of the value of the key depressed, ordinal differential members having electromagnetic controlling means connected to said disc controlled contacts, counting wheels coacting with said differential members for computation in the positive or negative sense respectively according to whether the contact rows of the value of the keys or of the complement thereof are in position, an addition key, a subtraction key, a rockable shifting member for shifting said switch board and operable by said addition and subtraction keys, said shifting member including state indicating means automatically rockable by said addition and subtraction keys in two positions for indicating the actual kind of calculation to which said switch board is shifted.

4. In a calculating machine, a keyboard, key controlled sets of contacts, controlling discs corresponding to the values "0" to "9," contacts controlled by said discs, a shiftable carrier having a plurality of pairs of rows of contacts extending transversely of said keyboard, each row of keys of equal value being associated with a pair of transverse rows of said contacts, one row of each pair of rows being connected with one of said disc controlled contacts corresponding to the value of the key depressed and the other row of each pair of rows being connected with that disc controlled contact representing the complement of the value of the key depressed, a register, magnet controlled differential members for said register, said differential members being controlled by said disc controlled contacts in dependence of the position of said contact carrier for computation in the positive or negative sense, respectively, a circuit closer including contacts for selectively making said sets of contacts operative on certain of said differential members, said circuit closer being arranged between said sets of contacts and said differential members, a first contact on said circuit closer and a second contact on said circuit closer, each of said last named contacts being common to several differential members to allow arrangement of differential members being greater in number than said sets of contacts.

5. In a calculating machine, a multi-denominational keyboard including key rows, key controlled contacts, a contact carrier having a plurality of pairs of rows of contacts extending transversely of said keyboard, each row of keys of equal value being associated with a pair of transverse rows of said contacts, a value generator, contacts controlled by said generator, one row of each pair of rows being connected with one of said generator controlled contacts corresponding to the value of the key depressed and the other row being connected with that generator controlled contact representing the complement of the value of the key depressed, differential members having electromagnetic controlling means connected to said generator controlled contacts, said controlling means being operative by said value generator and adapted for computation in the positive and negative sense respectively according to whether the contact series of the value of the keys or of the complement thereof are in position, an addition key, a subtraction key, a universal member common to said addition and subtraction keys and connected to said carrier to selectively move said carrier and the contacts thereon, a motor for driving said value generator, and contact controlling members included in said value generator for controlling the limit of the movement of said differential members.

6. In a calculating machine, a keyboard including value key rows, a driving shaft, a motor cooperating with said driving shaft, key controlled contacts, controlling discs corresponding to the values "0" to "9," contacts controlled by said discs, a slidable switch board having a plurality of pairs of rows of contacts extending transversely of the keyboard, each row of keys of equal value being associated with a pair of transverse rows of said contacts, one row of each pair of rows being connected with one of said disc controlled contacts corresponding to the value of the key depressed and the other row of each pair of rows being connected with that disc controlled contact representing the complement of the value of the key depressed, ordinal differential members having electromagnetic controlling means connected to said disc controlled contacts, counting wheels coacting with said differential members for computation in the positive or negative sense respectively according to whether the contact rows of the value of the keys or of the complement thereof are in position, an addition key, a subtraction key, a universal member connected to said switch board and rockable by said addition key and said subtraction key to determine the position of said switch board, a control shaft, members on said control shaft, one of said members being adapted to coact with said addition key and the other member being adapted to coact with said subtraction key, said driving shaft supporting said controlling discs and effecting the closure of said disc controlled contacts on rotation of said driving and controlling shaft, locking means on said driving shaft, connecting means between said members and said locking means, a motor contact, a member for controlling said locking means and said motor contact and adapted to be operated by said control shaft for releasing said locking means and closing said motor contact to render said motor operative, one of each of said key controlled contacts being common to one contact of one of said first named rows of contacts and to one contact of one of said second named rows of contacts, and one of said contact controlling members being common to one row of the contacts of said first named rows of contacts and to one row of the contacts of said second named rows of contacts.

7. In a calculating machine, a result register, a multi-denominational keyboard including key rows having a plurality of sets of key controlled contacts, controlling discs corresponding to the values 0 to 9, contacts controlled by said discs, a slidable contact carrier having a plurality of pairs of rows of contacts, one row of each pair of rows being connected with one of said disc controlled contacts corresponding to the value of the key depressed and the other row of each pair of rows being connected with that disc controlled contact representing the complement of the value of the key depressed, differential members for said register controlled by the closure of said disc controlled contacts through said sets of contacts, a distributor for selectively making said sets of contacts operative on certain of said differential members, an indicating device for said register including a drum, column shifting keys for said distributor and said indicating drum, a two pawl drive between said indicating drum and said shifting keys, said column shifting keys being adapted to shift said indicating device in a position to indicate on which of said differential members said sets of contacts are operative and in which decimal places of the result register, respectively and to bring said distributor in a position for rendering operative said sets of contacts on said selected differential members.

8. In a calculating machine, a keyboard including value key rows, each row having a key controlled set of contacts, a displaceable carrier having a plurality of pairs of rows of connected contacts extending transversely of said keyboard, one row of said connected contacts being adapted to control the computation of the positive numbers and the other row of said connected contacts being adapted to control the computation of the negative numbers as the complements of said positive numbers, each key controlled set of contacts of equal value being associated with a pair of transverse rows of said contacts, manipulative means for selectively displacing said carrier, connecting means between said rows of contacts for controlling the computation of the positive numbers and said rows for controlling the computation of the negative numbers, the contacts of the tens decimal place of said contact rows for controlling the computation of the negative numbers having electrical connection displaced upwardly by unity with the contacts of the units decimal place of said contact rows for securing the tens complement in the units decimal place instead of the nines complement in the other decimal places.

9. In a calculating machine, a keyboard, including keys, key controlled sets of contacts, a displaceable carrier having a plurality of rows of contacts for controlling the computation of positive numbers and a plurality of rows of contacts for controlling the computation of negative numbers as complements of said positive numbers, a register, differential members, magnets on said differential members, said magnet controlled differential members for said register being controlled by said sets of contacts and said rows of contacts of the carrier, column shifting keys, a circuit closer operated by said key for selectively making said sets of contacts operative on certain of said differential members, said circuit closer being arranged between said sets of contacts and said contact rows of the carrier respectively and said differential members, stationary contacts for said circuit closer, said stationary contacts being connected to the magnets of the differential members, said differential members being greater in number than said sets of contacts and contacts of said contact rows of the carrier, respectively, controlling said differential member, a contact on said circuit closer common to several of said stationary contacts of the circuit closer controlling of higher places and connected to an additional contact of the zero contact row for controlling the computation of numbers in a positive and negative sense of the remaining numeral wheels of the result register.

10. In a calculating machine, rows of contact springs, a keyboard including rows of value keys for controlling said contact springs, a result register, controlling discs corresponding to the values 0 to 9, contacts controlled by said discs, differential members for said register controlled by the closure of said disc controlled contacts, a movable carrier having a plurality of pairs of rows of contacts extending transversely of said keyboard cooperating with said contact springs and being associated with said value key rows, the first of each of said plurality of pairs of rows of contacts being connected with one of said disc controlled contacts corresponding to the value of the key depressed and the second of each of said plurality of pairs of rows of contacts being connected with that disc controlled contact representing the complement of the value of the key depressed, said carrier being common to all rows of contact springs and common to all carrier contacts, manipulative means for selectively moving said carrier in two positions for controlling the result register either for computing numbers in the positive sense or in the negative sense according to whether said first or said second named plurality of rows of contacts are in cooperative relation to said key controlled contact springs.

11. In a calculating machine, rows of contact springs, a keyboard including rows of value keys for controlling said contact springs, a result register, controlling discs corresponding to the values 0 to 9, a driving shaft for said controlling discs, contacts controlled by said discs, differential members for said register controlled by the closure of said disc controlled contacts, a movable carrier, a plurality of pairs of rows of contacts on said carrier extending transversely of said keyboard cooperating with said contact springs and being associated with said value key rows, the first of each of said plurality of pairs of rows of contacts being connected with one of said disc controlled contacts corresponding to the value of the key depressed and the second of each of said plurality of pairs of rows of contacts being connected with that disc controlled contact representing the complement of the value of the key depressed, said carrier being common to all rows of contact springs and common to all carrier contacts, an addition key, a subtraction key, a universal member connected to said carrier and rockable by said addition key and said subtraction key, said universal member being adapted to bring said first named series of contacts into cooperative relation with said contact springs by depression of said addition key and to bring said second named series of contacts into cooperative relation with said contact springs by depression of said subtraction key.

12. In a calculating machine, rows of contact springs, a keyboard including rows of value keys from "0" to "9" for controlling said contact springs, a result register, controlling discs corresponding to the values 0 to 9, a driving shaft for said controlling discs, contacts controlled by said discs, differential members for said register controlled by the closure of said disc controlled contacts, a movable carrier, a plurality pairs of rows of contacts on said carrier extending transversely of said keyboard cooperating with said contact springs and being associated to said value key rows, the first of each of said plurality of pairs of rows of contacts being connected with one of said disc controlled contacts corresponding to the value of the key depressed and the second of each of said plurality of pairs of rows of contacts being connected with that disc controlled contact representing the complement of the value of the key depressed, said carrier being common to all rows of contact springs and common to all carrier contacts, an operating member for each of said key rows from "0" to "9," a contact spring carried by each operating member, a spring for each operating member for normally retaining the contact spring carried thereby in operative relation to the related zero contact, each key of each key row controlling one of said operating members.

WERNER HEINZE.